US012728883B2

(12) United States Patent
Ehsanibenafati et al.

(10) Patent No.: US 12,728,883 B2
(45) Date of Patent: Sep. 8, 2026

(54) SAFE PATH SELECTION

(71) Applicant: Nvidia Corporation, Santa Clara, CA (US)

(72) Inventors: Aidin Ehsanibenafati, Santa Clara, CA (US); Jonas Nilsson, Los Gatos, CA (US); Amir Akbarzadeh, San Jose, CA (US); Hae Jong Seo, Campbell, CA (US)

(73) Assignee: Nvidia Corporation, Santa Clara, CA (US)

( * ) Notice: Subject to any disclaimer, the term of this patent is extended or adjusted under 35 U.S.C. 154(b) by 143 days.

(21) Appl. No.: 17/483,019

(22) Filed: Sep. 23, 2021

(65) Prior Publication Data

US 2022/0144304 A1 May 12, 2022

Related U.S. Application Data

(60) Provisional application No. 63/111,250, filed on Nov. 9, 2020.

(51) Int. Cl.
*B60W 60/00* (2020.01)
*G06F 18/25* (2023.01)

(52) U.S. Cl.
CPC ........... *B60W 60/001* (2020.02); *G06F 18/25* (2023.01); *B60W 2420/403* (2013.01); *B60W 2420/408* (2024.01); *B60W 2552/53* (2020.02)

(58) Field of Classification Search
CPC ........... B60W 60/001; B60W 2420/42; B60W 2420/52; B60W 2552/53; G06F 18/25;
(Continued)

(56) References Cited

U.S. PATENT DOCUMENTS 11,047,978 B2 * 6/2021 Shan ..................... G01S 13/931
2016/0147224 A1 * 5/2016 Roger ..................... G08G 5/55 701/3

(Continued)

FOREIGN PATENT DOCUMENTS

CN 108562923 A 9/2018
CN 109405824 A 3/2019

(Continued)

OTHER PUBLICATIONS

Translation of DE-102015115012-A1 (Year: 2017).*

*Primary Examiner* — Faris S Almatrahi
*Assistant Examiner* — Selena M Jin
(74) *Attorney, Agent, or Firm* — Hogan Lovells Cadwalader US LLP

(57) ABSTRACT

An architecture can generate lane graphs or path determinations, for devices such as robots or autonomous vehicles, using multiple sources of data while satisfying applicable requirements and regulations for operation. A system can fuse together data from multiple sources useful to determine localization. To ensure safety compliance, this fused data is compared against data from systems where safety is trusted and, as long as at least two comparators agree with the fused localization data, the fused localization data can be used and verified to be safety regulation compliant. This system can also fuse together available information useful for lane perception. This fused data is compared against data from systems where the safety is trusted, and as long as at least two comparators for these safety-compliant systems agree with the fused lane graph data, then the fused lane graph data can be provided for navigation and verified to be regulation compliant.

20 Claims, 22 Drawing Sheets

(58) Field of Classification Search
CPC ................ G01C 21/28; G01C 21/3407; G01C 21/3811; G06V 20/588
See application file for complete search history.

(56) References Cited

U.S. PATENT DOCUMENTS

| | | | | |
|---|---|---|---|---|
| 2017/0025018 | A1* | 1/2017 | Gignac | G08G 1/167 |
| 2018/0174459 | A1* | 6/2018 | Oh | B60W 30/10 |
| 2019/0003838 | A1* | 1/2019 | Kudrynski | G01C 21/3837 |
| 2019/0113629 | A1* | 4/2019 | Kang | G01S 19/06 |
| 2019/0204095 | A1* | 7/2019 | Anderson | G01C 21/3407 |
| 2020/0139967 | A1* | 5/2020 | Beller | G05D 1/81 |
| 2020/0232806 | A1* | 7/2020 | Goldman | G08G 1/167 |
| 2021/0122373 | A1* | 4/2021 | Dax | B60W 30/18159 |
| 2021/0331703 | A1* | 10/2021 | Duan | G05D 1/65 |
| 2022/0018681 | A1* | 1/2022 | Li | G01S 19/20 |
| 2022/0221278 | A1* | 7/2022 | Ries | G01C 21/005 |
| 2023/0033951 | A1* | 2/2023 | Karagiannis | G06F 1/1626 |

FOREIGN PATENT DOCUMENTS

| | | | | |
|---|---|---|---|---|
| CN | 110646825 | A | 1/2020 | |
| DE | 102015115012 | A1 * | 3/2017 | G06V 20/56 |
| EP | 3043289 | A1 * | 7/2016 | H04N 13/239 |
| EP | 3073224 | A1 * | 9/2016 | G01C 21/165 |
| JP | 2012208010 | A | 10/2012 | |
| JP | 2019175423 | A | 10/2019 | |

* cited by examiner

500

SAFE PATH SELECTION

CROSS-REFERENCE TO RELATED APPLICATIONS

This application claims priority to U.S. Provisional Application Ser. No. 63/111,250, filed Nov. 9, 2020, and entitled "Safety Decomposition for Autonomous Vehicles Path Detection," which is hereby incorporated herein in its entirety and for all purposes.

BACKGROUND

As various industries more towards increased automation, whether for vehicles, robots, or other automated systems, there is a corresponding need to improve the safety of operations performed by this automation. This can include improving the accuracy of motions or navigation, such as to determine an optimal path for an automated machine under current conditions of an environment in which that machine is located. For many automation systems, there can be various sensors and sources that provide data useful in determining such paths. In order to ensure that such path determination approaches satisfy specific safety requirements or regulations, individual determinations are made that are determined to comply with these requirements or regulation. Such an approach can provide for safe operation in most instances, but may provide a less than desirable operational experience, such as for passengers in an automated car that provides a ride that is safe, but not particularly smooth or continually pleasant.

BRIEF DESCRIPTION OF THE DRAWINGS

Various embodiments in accordance with the present disclosure will be described with reference to the drawings, in which.

DETAILED DESCRIPTION

Figure 1A:
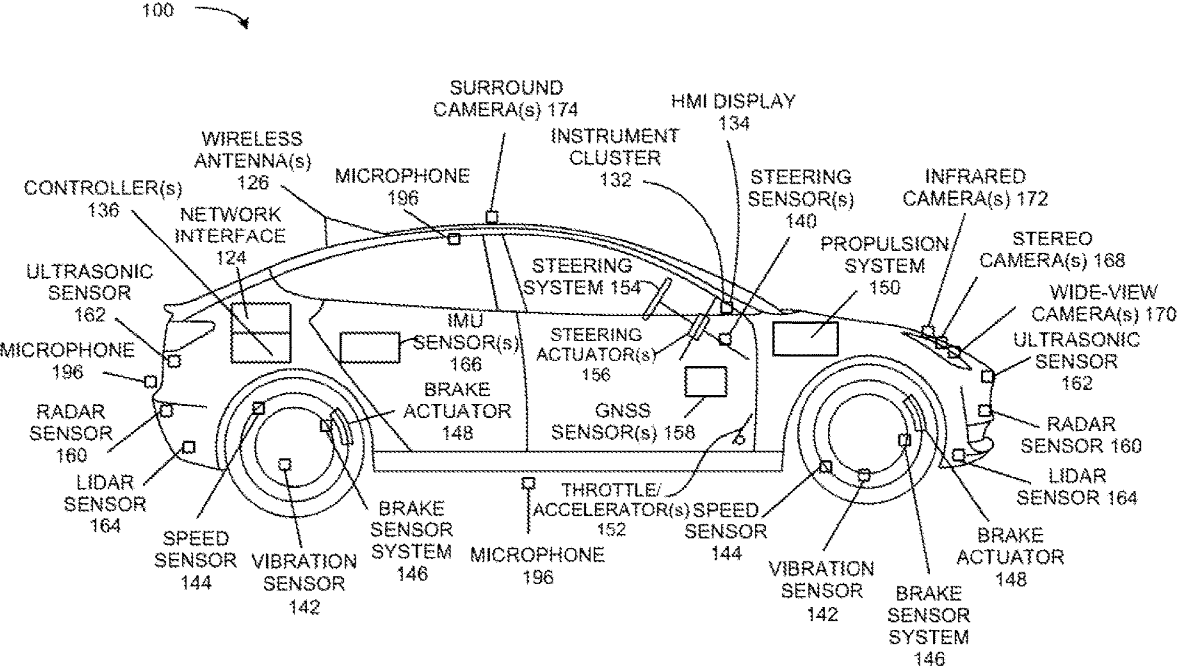
FIGS. 1A and 1B illustrate examples of components of an autonomous vehicle, according to at least one embodiment.

Approaches in accordance with various embodiments can provide for the generation of navigational paths, graphs, or trajectories for automated, or semi-automated, devices, such as vehicles or robots. In particular, various embodiments fuse or otherwise consider information from multiple sources to determine optimal localization and lane graph determinations that are also compliant with corresponding requirements or regulations, as may relate to safety of operations. For an autonomous (or semi-autonomous) vehicle or robot, this may involve determining an optimal lane graph for use in directing navigation or motion based on a combination of, for example, map data and real time perception data. In at least one embodiment, a system (e.g., an electronic control unit (ECU)) can fuse together sensor data that can help to determine localization, such as data from a radar or camera system. In order to provide for safety compliance, this fused data can be compared against data from individual systems where the safety is trusted, such as from a safety-compliant camera or radar system. As long as at least two comparators or "voters" for these safety-compliant systems agree with the fused localization data, then the fused localization data can be used and can be verified to be safety regulation compliant. This fused localization data can be provided as input to a lane perception system.

In a similar fashion, such a system (e.g., ECU) can fuse together, or otherwise consider, available and reliable information useful for lane perception and graph generation, as may relate to HD graphs and live lane perception data, as may be determined using a camera or LIDAR system, as well as the fused localization data. In order to provide for safety compliance, the fused lane graph data can also be compared against data from systems where the safety is trusted, such as may be generated using data from a safety-compliant camera or LIDAR system. As long as at least two comparators for these safety-compliant systems agree with the fused lane graph data, then the fused lane graph data can be provided for navigation, and can be verified to be safety regulation compliant. If the fused lane graph data does not receive at least two votes from these comparators, or otherwise is determined not to satisfy one or more other safety criteria, then another of these lane graph or navigation determinations can be used. Such a system can provide for switching between navigation determinations to ensure that the vehicle operates safely at all times, even if one or more of the systems on the vehicle becomes unavailable or unreliable.

Such a system may also utilize at least some amount of dead reckoning, where historical data may be utilized for limited periods of time where the live perception data is unavailable, or at least unreliable. Further, the selection of inputs to be fused together for either the localization or live perception data can be switched over time depending upon confidence and availability. One or more arbiters can analyze the fused data and, if unavailable or unreliable, may substitute one of the safety-compliant signals in order to ensure that the vehicle can continue to operate safely. At least two ECUs can also be used in some embodiments, such as one for vehicle data and one for satellite data, where live switching can be performed to operate on lane graphs from either or both ECUs, to ensure the vehicle can continue to operate safely if one signal is unavailable or unreliable.

Consider an autonomous vehicle 100 illustrated in FIG. 1A. In at least one embodiment, vehicle 100 may be, without limitation, a passenger vehicle, such as a car, a truck, a bus, and/or another type of vehicle that accommodates one or more passengers. In at least one embodiment, vehicle 100 may be a semi-tractor-trailer truck used for hauling cargo. In at least one embodiment, vehicle 100 may be an airplane, robotic vehicle, or other kind of vehicle, that may or may not be intended to carry passengers or cargo, but may be intended to perform one or more tasks that require at least some amount of motion or movement of the vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 100 may be capable of functionality in accordance with one or more of level 1-level 5 of autonomous driving levels. For example, in at least one embodiment, vehicle 100 may be capable of conditional automation (Level 3), high automation (Level 4), and/or full automation (Level 5), depending on embodiment.

In at least one embodiment, vehicle 100 may include, without limitation, components such as a chassis, a vehicle body, wheels (e.g., 2, 4, 6, 8, 18, etc.), tires, axles, and other components of a vehicle. In at least one embodiment, vehicle 100 may include, without limitation, a propulsion system 150, such as an internal combustion engine, hybrid electric power plant, an all-electric engine, and/or another propulsion system type. In at least one embodiment, propulsion system 150 may be connected to a drive train of vehicle 100, which may include, without limitation, a transmission, to enable propulsion of vehicle 100. In at least one embodiment, propulsion system 150 may be controlled in response to receiving signals from a throttle/accelerator(s) 152.

In at least one embodiment, a steering system 154, which may include, without limitation, a steering wheel, is used to steer a vehicle 100 (e.g., along a desired path or route) when a propulsion system 150 is operating (e.g., when vehicle is in motion). In at least one embodiment, a steering system 154 may receive signals from steering actuator(s) 156. A steering wheel may be optional for full automation (Level 5) functionality. In at least one embodiment, a brake sensor system 146 may be used to operate vehicle brakes in response to receiving signals from brake actuator(s) 148 and/or brake sensors.

In at least one embodiment, controller(s) 136, which may include, without limitation, one or more system on chips ("SoCs") (not shown in FIG. 1A) and/or graphics processing unit(s) ("GPU(s)"), provide signals (e.g., representative of commands) to one or more components and/or systems of vehicle 100. For instance, in at least one embodiment, controller(s) 136 may send signals to operate vehicle brakes via brake actuator(s) 148, to operate steering system 154 via steering actuator(s) 156, and/or to operate propulsion system 150 via throttle/accelerator(s) 152. Controller(s) 136 may include one or more onboard (e.g., integrated) computing devices (e.g., supercomputers) that process sensor signals, and output operation commands (e.g., signals representing commands) to enable autonomous driving and/or to assist a human driver in driving vehicle 100. In at least one embodiment, controller(s) 136 may include a first controller 136 for autonomous driving functions, a second controller 136 for functional safety functions, a third controller 136 for artificial intelligence functionality (e.g., computer vision), a fourth controller 136 for infotainment functionality, a fifth controller 136 for redundancy in emergency conditions, and/or other controllers. In at least one embodiment, a single controller 136 may handle two or more of above functionalities, two or more controllers 136 may handle a single functionality, and/or any combination thereof.

In at least one embodiment, controller(s) 136 provide signals for controlling one or more components and/or systems of vehicle 100 in response to sensor data received from one or more sensors (e.g., sensor inputs). In at least one embodiment, sensor data may be received from, for example and without limitation, global navigation satellite systems ("GNSS") sensor(s) 158 (e.g., Global Positioning System sensor(s)), RADAR sensor(s) 160, ultrasonic sensor(s) 162, LIDAR sensor(s) 164, inertial measurement unit ("IMU") sensor(s) 166 (e.g., accelerometer(s), gyroscope(s), magnetic compass(es), magnetometer(s), etc.), microphone(s) 196, stereo camera(s) 168, wide-view camera(s) 170 (e.g., fisheye cameras), infrared camera(s) 172, surround camera(s) 174 (e.g., 360 degree cameras), long-range cameras (not shown in FIG. 1A), mid-range camera(s) (not shown in FIG. 1A), speed sensor(s) 144 (e.g., for measuring speed of vehicle 100), vibration sensor(s) 142, steering sensor(s) 140, brake sensor(s) (e.g., as part of brake sensor system 146), and/or other sensor types.

In at least one embodiment, one or more of controller(s) 136 may receive inputs (e.g., represented by input data) from an instrument cluster 132 of vehicle 100 and provide outputs (e.g., represented by output data, display data, etc.) via a human-machine interface ("HMI") display 134, an audible annunciator, a loudspeaker, and/or via other components of vehicle 100. In at least one embodiment, outputs may include information such as vehicle velocity, speed, time, map data (e.g., a High Definition map (not shown in FIG. 1A), location data (e.g., vehicle 100's location, such as on a map), direction, location of other vehicles (e.g., an occupancy grid), information about objects and status of objects as perceived by controller(s) 136, etc. For example, in at least one embodiment, HMI display 134 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 100 further includes a network interface 124 which may use wireless antenna(s) 126 and/or modem(s) to communicate over one or more networks. For example, in at least one embodiment, network interface 124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 126 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 1B:
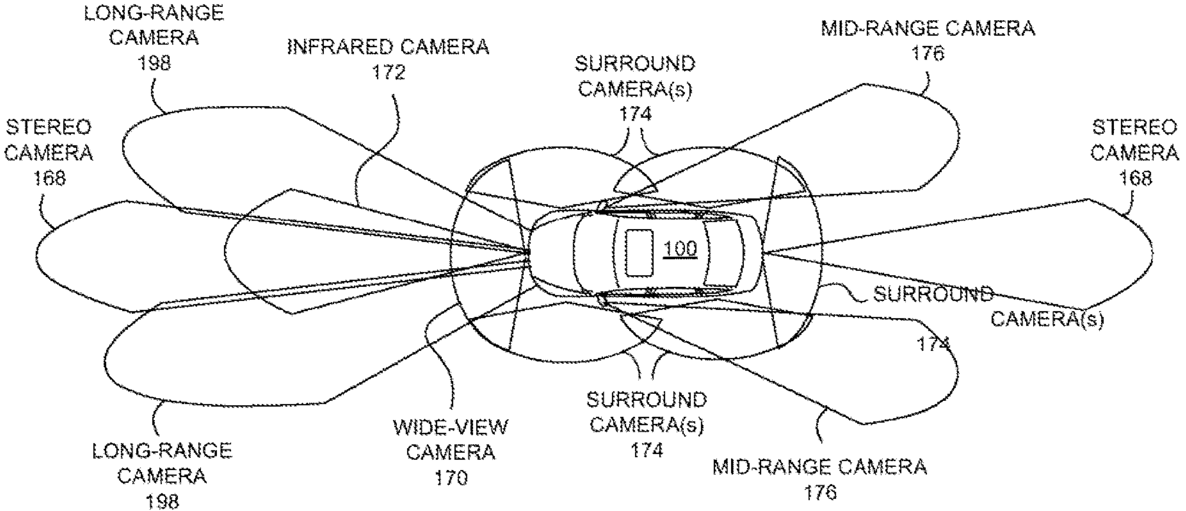

FIG. 1B illustrates an example of camera locations and fields of view for autonomous vehicle 100 of FIG. 1A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 100.

In at least one embodiment, camera types for cameras may include, but are not limited to, digital cameras that may be adapted for use with components and/or systems of vehicle 100. In at least one embodiment, one or more of camera(s) may operate at automotive safety integrity level ("ASIL") B and/or at another ASIL. In at least one embodiment, camera types may be capable of any image capture rate, such as 60 frames per second (fps), 120 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner in at least one embodiment.

In at least one embodiment, cameras with a field of view that include portions of environment in front of vehicle 100 (e.g., front-facing cameras) may be used for surround view, to help identify forward facing paths and obstacles, as well as aid in, with help of one or more of controllers 136 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 170 may be used to perceive objects coming into view from periphery (e.g., pedestrians, crossing traffic or bicycles). Although only one wide-view camera 170 is illustrated in FIG. 1B, in other embodiments, there may be any number (including zero) of wide-view camera(s) 170 on vehicle 100. In at least one embodiment, any number of long-range camera(s) 198 (e.g., a long-view stereo camera pair) may be used for depth-based object detection, especially for objects for which a neural network has not yet been trained. In at least one embodiment, long-range camera(s) 198 may also be used for object detection and classification, as well as basic object tracking.

In at least one embodiment, any number of stereo camera(s) 168 may also be included in a front-facing configuration. In at least one embodiment, one or more of stereo camera(s) 168 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 100, including a distance estimate for all points in image. In at least one embodiment, one or more of stereo camera(s) 168 may include, without limitation, compact stereo vision sensor(s) that may include, without limitation, two camera lenses (one each on left and right) and an image processing chip that may measure distance from vehicle 100 to target object and use generated information (e.g., metadata) to activate autonomous emergency braking and lane departure warning functions. In at least one embodiment, other types of stereo camera(s) 168 may be used in addition to, or alternatively from, those described herein.

In at least one embodiment, cameras with a field of view that include portions of environment to side of vehicle 100 (e.g., side-view cameras) may be used for surround view, providing information used to create and update occupancy grid, as well as to generate side impact collision warnings. For example, in at least one embodiment, surround camera(s) 174 (e.g., four surround cameras 174 as illustrated in FIG. 1B) could be positioned on vehicle 100. In at least one embodiment, surround camera(s) 174 may include, without limitation, any number and combination of wide-view camera(s) 170, fisheye camera(s), 360 degree camera(s), and/or like. For instance, in at least one embodiment, four fisheye cameras may be positioned on front, rear, and sides of vehicle 100. In at least one embodiment, vehicle 100 may use three surround camera(s) 174 (e.g., left, right, and rear), and may leverage one or more other camera(s) (e.g., a forward-facing camera) as a fourth surround-view camera.

In at least one embodiment, cameras with a field of view that include portions of environment to rear of vehicle 100 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 198 and/or mid-range camera(s) 176, stereo camera(s) 168), infrared camera(s) 172, etc.), as described herein.

In order for such a vehicle to perform a task such as navigation to a destination, a control system can determine one or more actions to take at any given time that correspond to that task. For an autonomous vehicle, this may include making one or more adjustments, such as to a steering or braking system, to cause the vehicle to maneuver in a determined way along a determined path, such as a path that causes the vehicle to navigate down a current lane of a road, within the lane markers, while avoiding collisions and operating at an appropriate speed. In order to determine appropriate actions to take, it can be beneficial in at least some systems to first determine the path or trajectory which the vehicle is to follow. Determining a navigation path can include steps of determining information about an environment which the vehicle is currently operating, such as a high definition (HD) map, model, or representation of the road and nearby objects, which may be obtained from a source having previously modeled that environment, or may be generated in real time using sensors or other mechanisms for perceiving information about the environment. It can also be beneficial in at least some embodiments to determine relevant localization data, or data that indicates where in that environment the vehicle is located, with sufficient accuracy to meet any safety or operational requirements.

As mentioned, however, in order to provide a pleasurable experience for passengers, it can be desirable to determine a path or series of operations that will be at least somewhat optimized for smoothness or comfort in addition to safety. In many instances, this involves a balance between safety and smooth operation, as it is very important to drive safely, but within the range of safe operations it can be desirable to determine a path that provides the most pleasant or consistent ride, such as one without rapid adjustments in direction, acceleration, or deceleration.

Further complicating the matter for at least some types of automation is the fact that operation of automated or semi-automated devices or systems, such as autonomous vehicles, are often subject to very specific or stringent safety requirements or regulations. While it may be desirable to combine data from various sources to determine an optimal path, it may be difficult to prove that such determinations satisfy those requirements or regulations. Further, information from various sources is often kept separate for safety reasons, such that failure of a given sensor or subsystem does not impact the entire operation of the vehicle, such as might result in a sub-optimal path determination. Thus, from a safety standpoint it may be desirable to keep information from different sensors, subsystems, or sources in separate, parallel, or redundant data streams. From an optimal operation standpoint, however, it may be preferable to combine as much information as is available in order to make the best possible decision at any given time.

As an example, an autonomous vehicle might utilize an Automated Driving System (ADS) that perform complicated dynamic driving tasks (DDT). For example, Society of Automotive Engineers (SAE) automation levels 3-5 currently require crash avoidance capabilities, such that human drivers are not required to take over the task of driving task during a failure event. Analysis of hazardous events and their risks can be performed using hazard analysis and risk assessment (HARA) according to the ISO 26262 standard. One of the main functionalities of an example ADS system, which is strongly tied to the safe operation of the ADS system, involves path detection. A path detection module can identify drivable paths, and can provide information regarding road geometry and topology. This may include, for example, data for the center path and/or boundaries of road lanes, as may be determined using data from sources such as images or video captured by cameras on the vehicle, LIDAR data, GPS data, IMU data, or HD map data obtained from a reliable source. Failure in a path detection module can result in hazardous events, such as departing the roadway or entering the path of oncoming traffic. HARA (hazard analysis and risk assessment) analysis suggests that such hazardous events can be fatal, such that there is a need to protect against these hazardous events at, for example, the highest Automotive Safety Integrity Level (ASIL) of ASIL D. In order to ensure that a system can protect against these and other such hazardous events with sufficiently high integrity level, any system, service, or process including or relying upon any of the functional components mentioned above needs to be verified and validated with stringent ASIL D compliance, which can require significant development effort and cost.

Accordingly, approaches in accordance with various embodiments can attempt to concurrently optimize for both safety and performance, while ensuring safety compliance of any produced result. In at least one embodiment, a path detection module of an ADS can provide for safety compliance, such as ASIL D compliance, which can significantly reduce the amount of effort needed for development, verification, and validation effort, while at the same time providing for improved flexibility and robustness in design. Such a system can provide for a fusion of path detection sources, as well as safety (e.g., ASIL D) monitoring of a fused path produced by the system. Such a system can provide for runtime switching between different combinations of localizations and live path perceptions, while providing for high availability. Such a system can also provide for a propagated fusion of fused localization and fused path based at least in part upon a process such as dead reckoning. If a vehicle is unable to detect lane markers at a present time, but those markers have been detected previously and information for those markers is stored, then the vehicle can use information about its speed and heading, for example, along with that historical data to infer perception data for at least a period of time, such as a few seconds depending upon factors such as speed and environment.

Figure 2A:
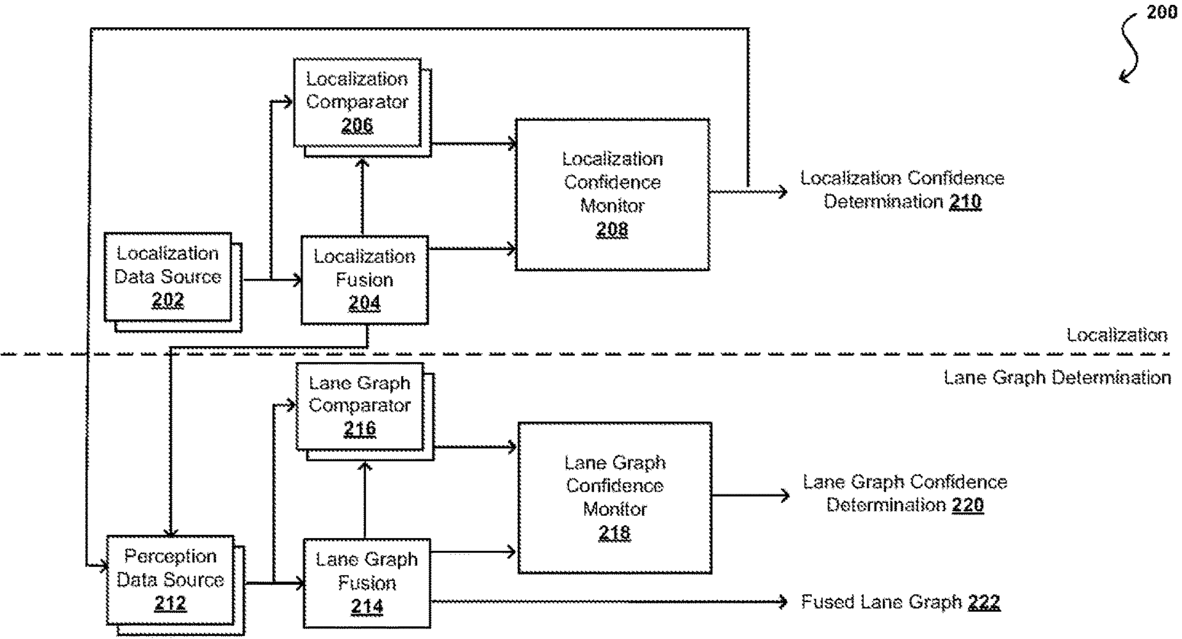
FIGS. 2A, 2B, and 2C illustrate views of a lane graph generation architecture that can be utilized, according to at least one embodiment.

FIG. 2A illustrates an overview 200 of an example path detection functional safety architecture that can be used with an automated or semi-automated system, device, or process, in accordance with various embodiments. Such architecture can enable an automated safety system to achieve SAE level 3 and above ADS. As will be indicated, components of such an architecture can provide for ASIL D (highest degree of automotive hazard avoidance), ASIL B(D) (a lower degree), and QM(D) compliance, where quality management (QM) compliance represents hazards that do not dictate any safety requirements. As mentioned, it can be important for such a system to avoid sending information for an incorrect or unsafe path—such as a path that causes the vehicle to drive off the road—to a controller of the vehicle, which may lead to a severe accident or injury. Such a path determination system therefore should ensure that information for the path being sent provides for safety integrity, such as path data that is ASIL D compliant. To avoid single point faults directly leading to an incorrect path in an ASIL D system, a system-level redundancy can be being employed such that no failure of a single component should lead to hazardous behavior or incorrect operation.

An architecture such as that illustrated in FIG. 2A can utilize independently- and diversely-generated lane graphs to monitor and ensure that each final lane graph used for driving is safe, such as with ASIL D assurance. In at least one embodiment, lane graphs can be generated independently based on various modules, such as perception data sources 212, providing or utilizing data from HD maps or live lane perception sources, such as one or more cameras or a lidar source on a vehicle. An ASIL D requirement for an ADS can be achieved, in at least one embodiment, by ensuring that a lane graph generated using combined data, or a "combined" or "fused" lane graph, agrees with both live lane perception and corresponding map data, at least within acceptable tolerance or variation. This can be referred to as an ASIL decomposition scheme between pairs of independent components in which, for example, ASIL D is split and allocated as ASIL B(D) for a perception lane graph comparator and map lane graph comparator, of a set of lane graph comparators 216, consistent with ISO 26262.

Such a system can, at runtime, switch between different diverse modules to ensure that the final output has integrity, such as ASIL D integrity, depending at least in part upon the availability of those modules. The ability to switch at runtime provides benefits including increased system availability, since such a system may be unable to ensure continued safe operation unless at least two diverse modules are available to confirm that the final output satisfied safety and other related requirements. It may not be sufficient for safety at all times that a path determination system can detect whether a combined path is correct with, for example, ASIL D integrity. In some cases where a driver cannot be used as a backup, such a system should guarantee that it can continue to produce correct paths until the system has reached a safe state, such as a vehicle being stopped in a safe location. In at least one embodiment, one or more software components can be used that are relatively simple and lightweight, which has benefits at least with respect to more complex software components that may provide lower safety integrity and higher latency.

The high level architecture 200 in FIG. 2A is separated into two portions, a portion (upper in the figure) that relates to localization and a portion (lower in the figure) that relates to lane graph generation. These portions are illustrated in more detail in FIGS. 2B and 2C, respectively. Localization can involve determining, based upon available and reliable information, at least a current location of an object (such as a vehicle or robot) in an environment, such as on a road. In this example, there may be multiple localization data sources 202, such as cameras (e.g., front wide cameras) and radar sensors, among other such options. Data from each of these sources can be used to generate a respective localization determination, such as a camera-based localization determination and a radar-based localization determination, where each determination can involve analyzing captured image or sensor data for purposes of making the respective determination. In this example, these separate determinations can be passed to a localization fusion component 204, which can generate a "combined" or "fused" localization determination based, at least in part, upon the available individual localization determinations, at least those that are generated with at least a minimum confidence. Various algorithms or approaches can be used to combine these determinations, as may relate to a weighted or spatial average, a neural network to infer an optimal value based on the available input, or a complex fusion function, among other such options. Where weightings are used, these may be based at least in part upon relative confidence values in the individual determinations. As mentioned, it can be beneficial to combine or fuse data from different subsystems or sources as there may be obstructions or other incidents that may cause at least a portion of the view of a camera or sensor to be unreliable, where that data may be able to be reliably determined or filled in from another source, while retaining the reliable data obtained from that camera or sensor. Using only that single system may cause problems if a portion of the view is obstructed, as a reliable determination may be unable to be made with sufficient confidence.

One or more localization comparators 206 can be used that compare the individual localization determinations and the fused determinations. As will be discussed in more detail later herein, these comparators can utilize additional input as well, such as localization determinations from other systems, such as satellite-based systems. The use of a satellite system can be beneficial in situations such as where a problem occurs on the vehicle and the vehicle needs to pull safely to the side of the road and stop, and a path can be generated based on satellite data to perform this task. A satellite system can be immune to problems on an individual vehicle, and may have additional sensors and processing available to provide additional reliable input. The results produced by the localization comparators can be provided as input to a localization confidence monitor 208, which can continually determine a localization confidence value 210 for at least the fused localization data. This can involve comparing the fused localization determination at each time point against the individual localization determinations to determine whether there is sufficient agreement. If the fused localization agrees with the ASIL D individual localization determinations, then the fused localization data can be used and verified to be ASIL D (or other such requirement) compliant as well.

As mentioned, there may be times when an individual sensor or source may not be able to provide accurate localization determinations, such as when a view is obscured, a sensor is saturated, or an occurrence impacts the reliability of the data. In such instances, the reliability of the localization data may be low, or at least lower than required by the relevant safety standards or requirements. In an architecture 200 such as that illustrated in FIG. 2A, multiple sources can be dynamically compared, combined, or selected in any of a number of different combinations, such that any source that is out of agreement can be ignored or discarded for at least that point in time. In at least one embodiment, it is sufficient for at least two of these ASIL D-compliant sources to agree for a respective localization determination to be used from one of those sources. Further, if at least two of those sources agree with the fused localization determination, then the fused localization determination can be utilized. As mentioned, one or more comparators 206 can be used to make respective comparisons, and the results of these comparisons can be analyzed by a monitor 208 to determine which localization determination is reliable and should be used. In a least one embodiment, these comparators 206 can be thought of as voters, as they vote whether two or more inputs agree within an acceptable range or threshold, for example. The respective monitor can then analyze the results of these voters, and if at least two voters agree that the fused localization determination is reliable, then the fused localization determination can be utilized. In this example, the confidence or health determination 210 can be provided for review, such as to ensure that the system is operating properly. The health determination 210 and the fused (or individual) localization determination can also be provided as input to one or more perception data sources, such as an HD mapping source, for purposes of determining an appropriate lane graph based, at least in part, upon that localization determination.

The lane graph portion of this architecture 200 operates somewhat similar to the localization portion. One or more perception data sources 212 are utilized, as may include one or more HD lane graph maps and one or more perception sources, such as cameras or LIDAR, that can generate data that can be analyzed to attempt to make live, or real-time, determinations of a lane graph based on this live perception data, or what the subsystems on (or associated with) the vehicle perceive to be the appropriate lane graph based on available information, such as image or sensor data. These proposed lane graphs can be provided to a lane graph fusion module 214 that can generate a fused or combined lane graph determination based, at least in part, upon fusing or combining these individual lane graph determinations (or predictions). A set of comparators 216 can also compare these individual and fused lane graphs to determine whether they are sufficiently in agreement. Results of these comparisons can be provided to a lane graph confidence monitor 218 that can determine whether the fused lane graph determination agrees with two or more of these individual determinations with sufficient confidence, and can output a determination of confidence 220 in at least the fused lane graph. If the confidence in the fused determination is sufficiently high, such as at least meets a minimum confidence threshold or value, then the fused lane graph 222 can be provided to the control system for use in, for example, navigating the vehicle. If the confidence in the fused lane graph is not sufficiently high, then a lane graph from one of the individual or other fused sources can be utilized in order to provide for continued safe operation, such as by selecting an individual lane graph with a highest confidence or health score. As mentioned, operating using an individual lane graph can provide for safe operation, but may not be as optimal from a performance angle.

Figure 2B:
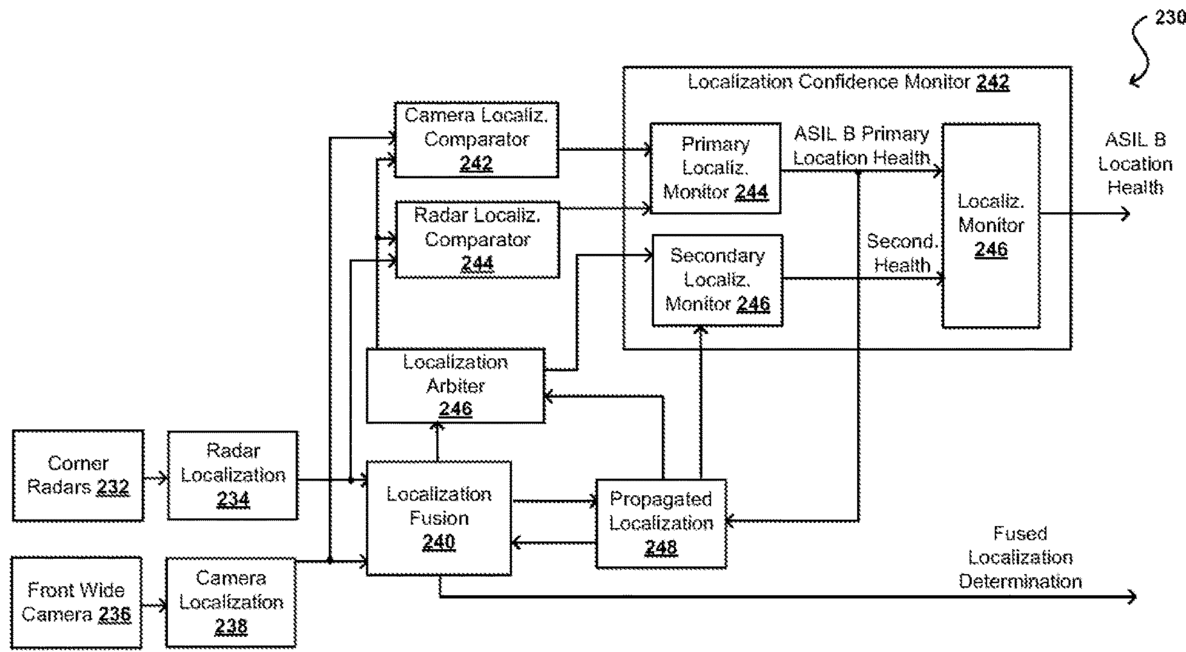
Figure 2C:
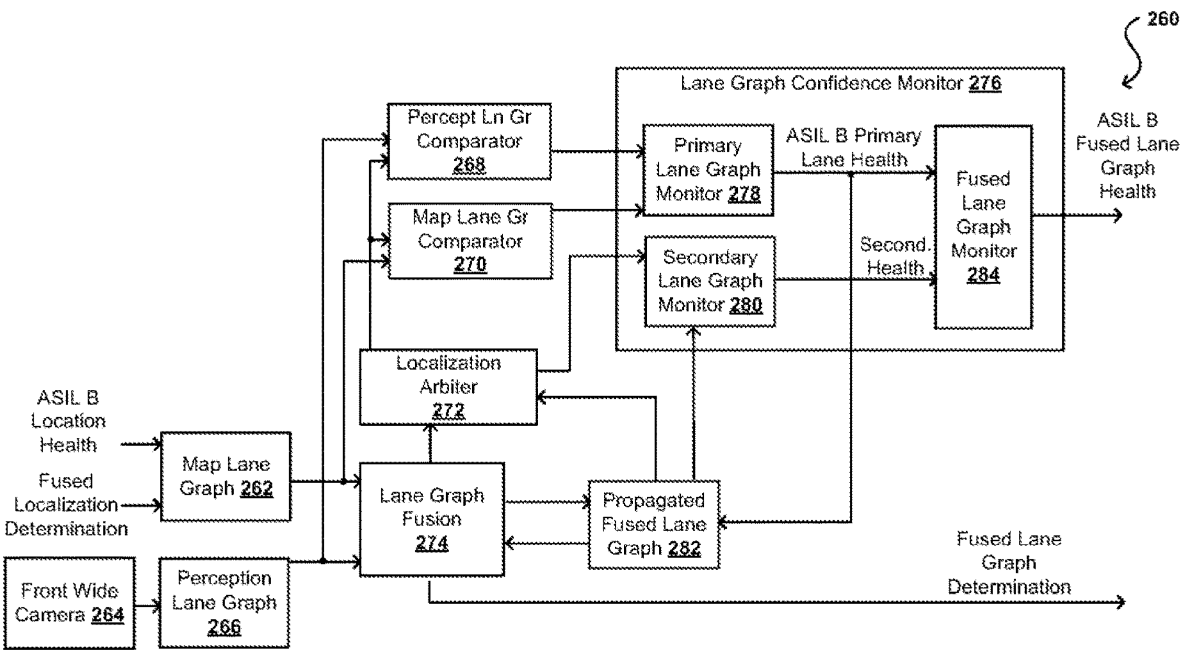

FIGS. 2B and 2C illustrate more detailed views of the localization and lane graph determination portions 230, 260, respectively, of this example architecture 200. In FIG. 2B it is illustrated that localization data sources such as corner radars 232 and a front wide camera 236 can provide data to respective localization modules 234, 238, which can produce individual localization determinations that can be provided to a localization fusion module 240 to generate a fused localization determination. The fused localization data can be provided to separate camera and radar localization components 242, 244, along with the respective individual localization determinations, for comparison, which can be passed along to a localization confidence (or health) monitor 242. The confidence monitor can include primary and secondary localization monitors 244, 246 that can generate respective confidence determinations, which can be analyzed by a localization monitor to generate a single localization confidence value. In at least some embodiments, these confidence determinations may be binary, indicating whether or not a fused determination is reliable. Reliability may be determined using a confidence score relative to a threshold in at least some embodiments. This health information can be passed to a propagated localization module, which can be used by the localization fusion module for a subsequent fused determination. The propagated fusion information and fused localization data can also be passed to a localization arbiter 246.

In FIG. 2C, the portion 260 of the architecture for lane graph determination is shown to receive the fused (or individual) localization determination and confidence value, or health determination, to a map lane graph 262 that can use this information with HD map data, for example, to generate a lane graph for current location and environmental conditions or state. One or more components, such as a front wide camera, can provide image data that can be utilized by a lane perception graph component 266 to generate a lane graph based, at least in part, upon recognizing objects such as lane markers and vehicles in the captured image or video data. These individual lane graph determinations can be provided to a lane graph fusion module 274, which can generate a fused lane graph determination based at least in part upon these, or other provided, individual lane graph determinations. The fused lane graph determination and individual lane graph determinations can be provided to comparators 268, 270 for comparing the information, and providing the results to a lane graph health monitor, which can include primary and secondary monitors 278, 280 for analyzing the comparison data and providing health or confidence determinations to a fuse lane graph monitor module or component 284, which can determine and output heath or confidence data for the fused lane graph, whereby the system can ensure that the fused lane graph satisfies all safety requirements, etc. This health information can also be provided to the propagated fused lane graph component, to provide data to the lane graph fusion module 274 for subsequent fused lane graph determinations, as well as to a localization arbiter 272 to determine whether the fused lane graph data is available and reliable, else one or more of the individual lane graph determinations should be utilized.

As illustrated, to improve the accuracy of the lane graph function, the lane graph fusion module 274 can utilize different sources of lane graph data, such as HD map-based lane graph and perception-based lane graph data, that can be fused together. This function can be rated as QM(D) in at least one embodiment of this architecture, and any appropriate fusion function can be utilized to achieve and maintain the most accurate possible lane graph output. A localization fusion module 240 can operate in a similar fashion, where a localization function can provide for QM(D) fusion of multiple localization sources, such as radar-based localization and camera-base localization sources, to achieve the best accuracy for the localization function. To achieve the ASIL D integrity required for the fused lane graph and the fused localization, the fused lane graph and the fused localization can be compared against two independent and diverse ASIL B(D) sources such as HD map-based lane graph and perception-based lane graph with camera and radar localizations, with the results sent to an ASIL D monitor that checks the status of the two comparisons. An example decomposition scheme can thus be given by:

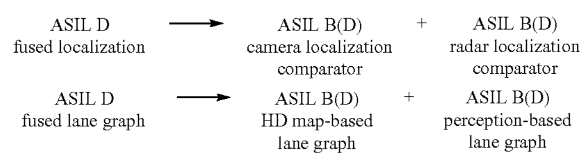

The ASIL D monitors 242, 276 provide a simple check on the lane graph comparators or localization comparators inputs to ensure that both comparators are valid at the same time, to be able to ensure an ASIL D-compliant lane graph or localization determination.

One of the most important aspects of an ADS system that performs complicated dynamic driving tasks is the availability of the system in the event of a failure. For the ADS systems rated at SAE Automation Levels 3-5, the system should be designed so that failures can be detected, and the system can continue to operate with the other available components and signals that are still functioning correctly. A propagated fused lane graph component 282 can generate representations of the lane lines on the road based on, for example, the last good value of the fused lane graph that passed the checks of both perception and map lane graph comparators. This module can take the last good value of the fused lane graph and estimate the new lane lines around the ego vehicle, for example, using relative ego motion (e.g., the direction, speed, and acceleration/deceleration of the vehicle). Such an approach can be referred to as dead reckoning in some embodiments, as it relies at least in part upon historical data when current data may not be sufficiently reliable. The propagated fused lane graph module 282 in this embodiment is ASIL D compliant, and can generate lane lines independently. In at least some embodiments, this propagated fused lane graph will only be accurate for a limited period of time due at least in part to the ego motion nature of error accumulation. Similarly, a propagated fused localization module 248 can generate the precise six degrees-of-freedom (DOF) position and orientation of the ego vehicle based, at least in part, upon the last good value of fused localization that passed the checks of both camera and radar localization comparators, for example. The module takes the last good value of the fused localization and estimates the new 6-DOF position and orientation of the ego vehicle using relative ego motion. This module is also ASIL D compliant, and can generate 6-DOF localization values independently. This propagated localization may also only be accurate for a limited period of time due at least in part to the ego motion nature of error accumulation. Dead reckoning can thus be used to transform a ASIL D-assured lane graph and maintain ASIL D integrity without available monitors for a limited period of time.

The propagated fusion for both localization and lane graph fusion can be used in combination with the runtime switching between different variants to further improve availability of the system. For example, if the system is running on radar-based localization and camera based path perception and camera-based path perception is lost for a few seconds, the system can continue with this variant on propagated fused lane graph for some time before switching to the camera based and radar-based localization variant.

In this example, the localization arbiter 246 can determine when the fused localization data is not available or sufficiently reliable, and can provide this data to the comparators and confidence monitor, whereby the system can determine to operate using the individual localization determinations and not the fused localization determination, at least for an instance or period of time. The architecture allows the fusion of the localization sources and the lane graph sources to happen at QM(D). This can result in the fusion function not being available for driving when the signal is not accurate enough to pass the tests of the comparators. The arbiters can pass through the ASIL B(D) localization and lane graph signals when the fusion signal is not available. Taking such an approach, the ASIL D output still holds, as the comparators independently check the inputs coming through and the ASIL D monitor still checks the two independent ASIL B(D) values.

Figure 3:
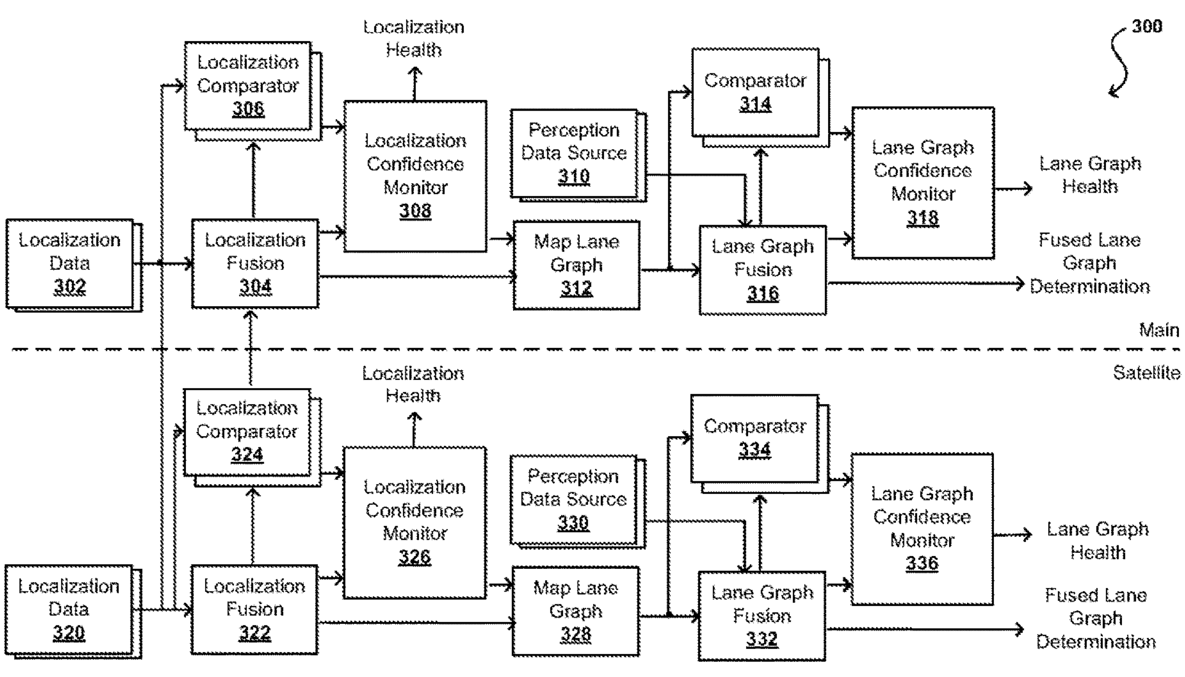
FIG. 3 illustrates a combined lane graph determination architecture that can be utilized, according to at least one embodiment.

In at least one embodiment, it can be further beneficial to be able to switch dynamically between different combinations of localizations and live path perceptions. FIG. 3 illustrates an example architecture 300 that can provide for such dynamic switching. This can include, for example, runtime switching between two localization determinations instead of localization and live path perception. In this example architecture, the map-based lane graph serves as an ASIL D component and the same ASIL D decomposition argument explained in for the previous architecture can be used for localization. This runtime switching between the live perception/localization and localization-only lane graphs can provide a significant amount of flexibility and can significantly improve availability. Other types of dynamic switching are possible as well, such as for map-based lane graphs, based on two independent sources of localization such as camera localization and radar localization, as well as live perception-based lane graphs, based on two independent sources of live perception such as camera lane perception and LIDAR lane perception. Other dynamic switching can be performed for map-based lane graphs and live perception-based lane graphs.

The architecture 300 of FIG. 3 also allows for dynamic switching between at least two electronic control units (ECUs), such as a main ECU in a vehicle, represented in a top portion of the architecture in FIG. 3, and a satellite-based ECU represented in a bottom portion. As illustrated, each ECU can include similar components for taking respective localization data 302, 320, generating a fused localization using a fusion component 304, 322, using comparators 306, 324 to compare the fused and individual localizations, and providing that information to a localization confidence monitor 308. In this example, at least some of the localization data from the satellite ECU can be provided as input to the comparators 306 of the main ECU, which can help to determine agreement among additional localization determinations. As illustrated, each ECU can take the localization determination and use that with a map lane graph module 312. 328 and can use data from one or more perception data sources 310, 330 to determine fused lane graphs using respective fusion modules 316, 332, which can be compared against individual lane graphs by respective comparators 314, 334 to have confidence determinations made by respective lane graph confidence monitors 318, 336. The confidence values for these lane graphs can be used to determine which lane graph to utilize. In at least some embodiments, the lane graph from the main ECU will be utilized unless it does not provide sufficient confidence, in which case a lane graph determination from the satellite ECU can be utilized. Spreading the functional components across two ECUs can even further improve availability in normal operation by passing localization and path detection signals across ECUs, which can compensate for degraded operation or loss of one of the ECUs.

In some situations, it can be desirable to perform at least some amount of switching due at least in part to a position in the environment. For example, if a vehicle is driving on a highway with very clear lane markers, then live lane perception may produce a very accurate lane graph. It might be the case, however, that the vehicle is in a large intersection where there are not clear markers as to how to proceed. In such situations, live lane perception may not be able to provide a reliable lane graph, but a map-based lane graph may be sufficiently reliable. During a trip, then, it is possible to switch multiple times between a live lane perception mode and a localization mode to continue driving safely based on conditions, states, or types of the road alone.

For autonomous vehicles where decisions need to be made very quickly in order to ensure safety, many of these components and much of this processing may be done on the vehicle itself, in order to avoid latency and connectivity issues. Thus, a vehicle may have one or more processors (e.g., CPUs or GPUs) to perform at least some of this processing. Portions of this functionality that may not be as time-critical, such as the updating of map data, may be performed by a remote server or in the cloud, among other such options. For autonomous vehicles, path determinations may need to be made on the order of milliseconds, such that it is desirable to have at least the independent path determination modules produce results in a quick and simplistic manner that can be relied upon in the event a fusion process falls behind, or cannot generate results on at least the same time scale for a period of time.

Figure 4:
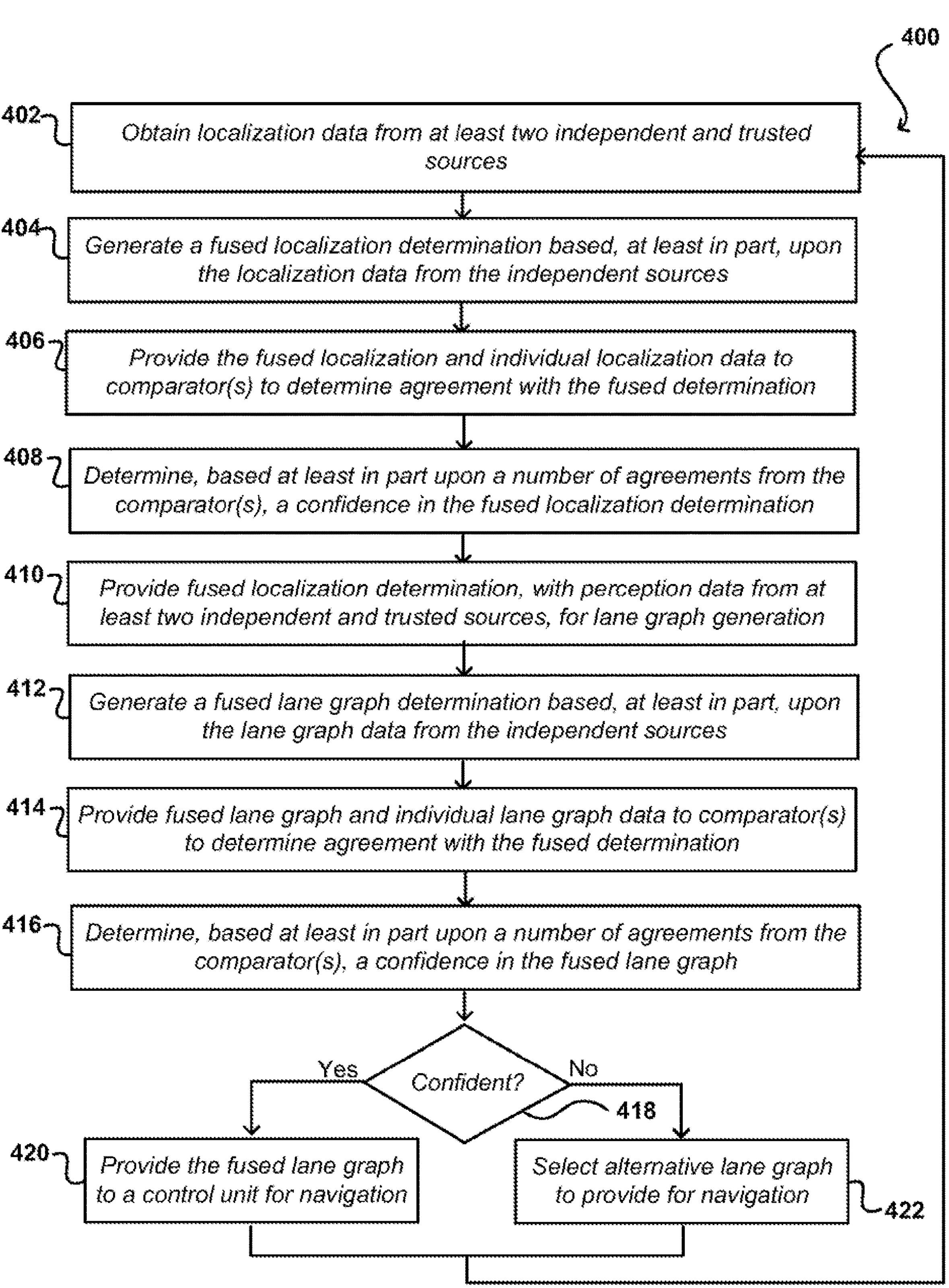
FIG. 4 illustrates an example process for determining a navigation path, according to at least one embodiment.

FIG. 4 illustrates an example process 400 for determining a navigation path, such as a lane graph, that can be utilized in accordance with various embodiments. It should be understood that for this and other processes discussed herein that there can be additional, fewer, or alternative steps performed in similar or alternative orders, or at least partially in parallel, within the scope of the various embodiments unless otherwise specifically stated. Further, although this example is described with respect to an autonomous vehicle operating within a given lane, it should be understood that other types of safety compliant paths or graphs can be determined for other autonomous or semi-autonomous vehicles, devices, robots, processes, or systems in accordance with the various embodiments.

In this example, localization data is obtained 402 from at least two independent and trusted sources. This can include, for example, capturing image or sensor data using various cameras or sensors, and making independent localization determinations based upon the respective types of data. Trusted data in this example can refer to data that is obtained from a system or process that has been determined to comply with one or more regulations or requirements, as may relate to safety, and that are determined with at least a minimum level of confidence. A fused localization determination can be generated 404 based, at least in part, upon the independent localization determinations from these independent and trusted sources. As mentioned, the fused determination can be made based upon any combination or subset of these individual determinations, as may be based at least in part upon factors such as confidence and availability. The fused and individual localization determinations can be provided 406 to one or more comparators to determine agreement between at least the independent determinations and the fused localization determination. In at least one embodiment, each comparator will compare a respective independent localization determination with the fused determination. The results of these comparators can be utilized to determine 408 a confidence or health in the fused localization determination, such as a binary decision as to whether the fused determination should be used or not based upon the confidence satisfying at least a minimum confidence threshold, else a different localization determination is to be selected for use.

The fused localization determination, or other localization determination if the fused determination is not selected according to the health of confidence information, can be provided 410 with live perception data, from at least two independent and trusted sources, to generate independent lane graphs. A fused lane graph can be generated 412 based, at least in part, upon these individual lane graphs from these independent sources. The fused lane graph and individual lane graph determinations can be provided 414 to one or more comparators for comparison between the fused and individual lane graphs. A confidence in the fused lane graph can be determined 416 based at least in part upon a number of agreements from the comparator(s). If it is determined 418 that the confidence or health of the fused lane graph satisfies at least a minimum confidence threshold or criterion, then the fused lane graph can be provided 420 to an operational component, such as a drive unit, or other device, system, service, or process, for navigation or operation of a respective vehicle. If the confidence in the fused line graph does not satisfy at least a minimum confidence threshold or criterion, then an alternative lane graph can be selected 422 to provide for navigation or operation, where the alternative lane graph can be any of the individual lane graphs, or a fused lane graph from another system or control unit, among other such options.

Figure 5:
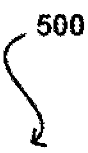
FIG. 5 illustrates an example processes for utilizing fusion propagation for path determination, according to at least one embodiment.

FIG. 5 illustrates another example process 500 that can utilize dead reckoning in localization or lane graph determinations in accordance with various embodiments. In this example, live perception data is obtained 502 from at least two independent and trusted sources. The live perception data received from each of these independent sources can be analyzed to determine 504 whether that data satisfies at least a minimum confidence criterion, such as may be necessary to ensure compliance with one or more safety regulations or requirements. If perception data is not received from one of these independent sources for a period of time, then that source may be treated similar to one of these sources with insufficient confidence. If it is determined 506 that the perception data from at least one of these independent sources does not satisfy a corresponding criterion, then a dead reckoning process can be initiated. This can involve accessing 580 recent fused and/or independent localization data, as well as determining 510 the current motion (e.g., ego motion) or state of the vehicle. Based at least in part upon the recent localization data and the motion or state of the vehicle, localization data can be inferred 512 for at least a period of time where the inference is determined to be reliable. This can involve inferring one or more individual localization determinations, or inferring a fused localization in various embodiments. If all the localization data is instead determined to satisfy all relevant criteria, then individual localization determinations can be determined 514 using the live perception data. If there are more than two localization determinations available, then a fused localization determination can be generated 516 based at least in part upon the available localization determinations, where this fused localization information can be analyzed for safety compliance using a process such as that described with respect to FIG. 4. If only the inferred localization determination is available, then that can be utilized for path determination, at least to enable the vehicle to operate safely, or move to a safe location, until reliable data is again available.

Various approaches presented herein are lightweight enough to execute on a various types of devices or systems, such as smart vehicles, robots, servers, personal computers, smart vehicles, or automated equipment, in real time. Such processing can be performed using data that is captured or generated on that device or system, or received from an external source, such as sensor or map data received over at least one network. The source can be any appropriate source, such as a separate client device, device management system, or third party data provider, among other such options. In some instances, the processing and/or use of this data may be performed by one of these other devices, systems, or entities, then provided to a vehicle (or another such recipient) for use.

Figure 6:
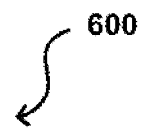
FIG. 6 illustrates components of a system for determining a navigation path, according to at least one embodiment.
Figure 6:
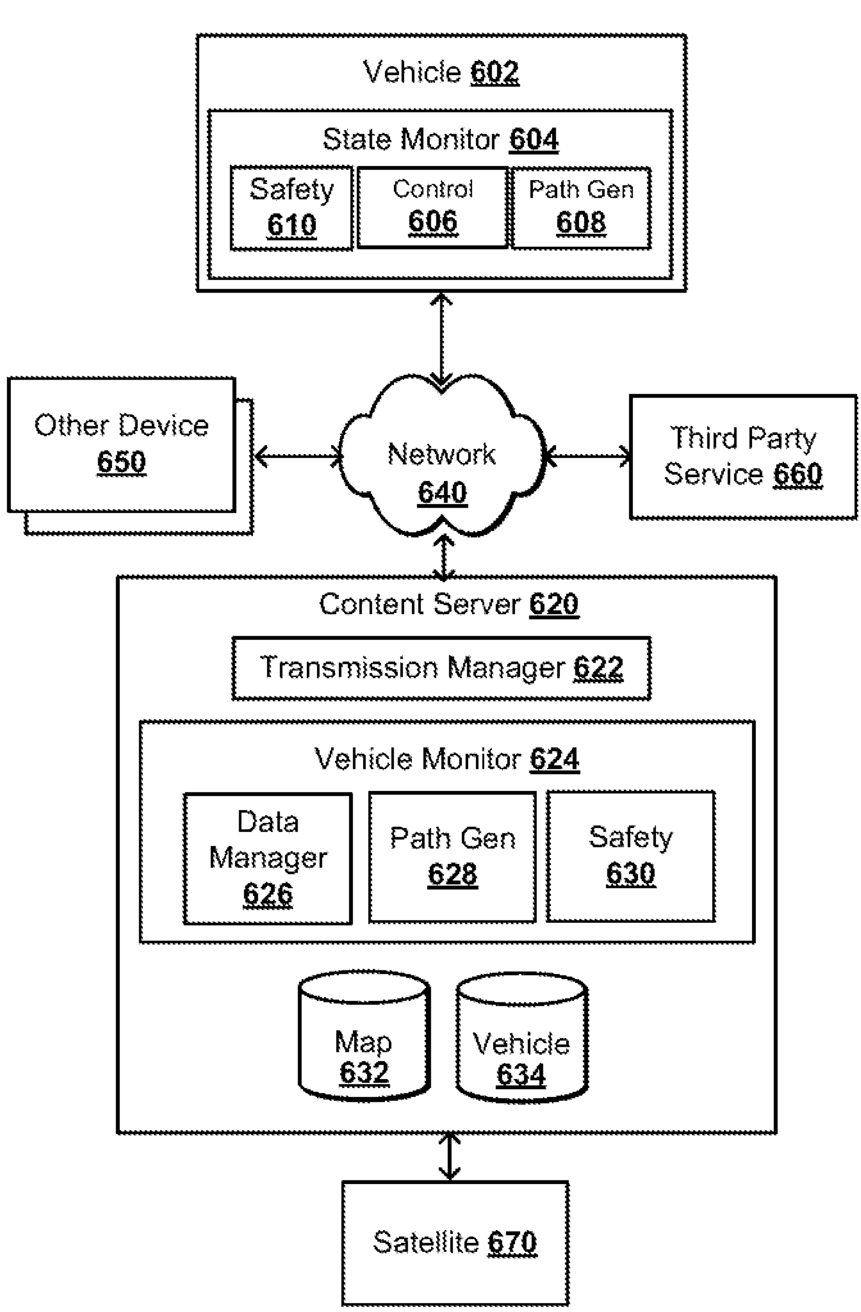

As an example, FIG. 6 illustrates an example network configuration 600 that can be used to provide, generate, modify, encode, and/or transmit data. In at least one embodiment, a vehicle 602, or other automated or semi-automated device or system, can generate or receive data using components of a state monitoring application 604 on the vehicle 602 and data stored locally on that vehicle. In at least one embodiment, a vehicle monitoring application 624 executing on a data or content server 620 (e.g., a cloud server or edge server) may initiate a session associated with at least vehicle 602, as may utilize a session manager and user data stored in a vehicle database 634, and can cause content relating to paths, localization, or operation to be determined or managed by a data manager 626. A path generation module 628 may attempt to utilize data from various sources to provide map, path, or localization data to the vehicle 602, using information that may be stored locally in a map database 632, received from a third party service 660, or received from a satellite 670, among other such options. Compliance of this data with one or more safety requirements may be determined using a safety module 630. In at least some embodiments, this data may intended to at least be redundant with data determined on the vehicle 602. At least a portion of this data may be transmitted to the vehicle 602 using an appropriate transmission manager 622 to send by download, streaming, or another such transmission channel. An encoder may be used to encode and/or compress this data before transmitting to the vehicle 602. In at least one embodiment, a vehicle 602 receiving this data can provide this data to a corresponding state monitor 604, which may also (or alternatively) include a path generator 608 and safety compliance module 6104 for analyzing data received to, or captured by, the vehicle 602 and generating or selecting appropriate operational instructions or determinations to provide to a control system 606 for the vehicle, such as may cause the vehicle to navigate along a determined path. A decoder may also be used to decode data received over the network(s) 640 as appropriate. In at least one embodiment, at least some of this data (e.g., map data or historical perception data) may already be stored on, generated on, or accessible to vehicle 602 such that transmission over network 640 is not required for at least that portion of data, such as where that data may have been previously downloaded or stored locally on a hard drive or optical disk. In at least one embodiment, a transmission mechanism such as data streaming can be used to transfer this data from server 620. In at least one embodiment, at least a portion of this data can be obtained, determined, or streamed from another source, such as separate client device 650 or a third party service 660 that may also include functionality for making relevant determinations. In at least one embodiment, portions of this functionality can be performed using multiple computing devices, or multiple processors within one or more computing devices, such as may include a combination of CPUs and GPUs.

In this example, devices can include any appropriate devices with computing or sensing capability, as may include a vehicle, robot, automated system, desktop computer, notebook computer, set-top box, streaming device, gaming console, smartphone, tablet computer, smart vehicle, robotic-assisted machine, VR headset, AR goggles, wearable computer, or a smart television. Each device may be able to transmit and receive requests across at least one wired or wireless network, as may include the Internet, an Ethernet, a local area network (LAN), or a cellular network, among other such options. In this example, these requests may be submitted to, or received from, an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for automation operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
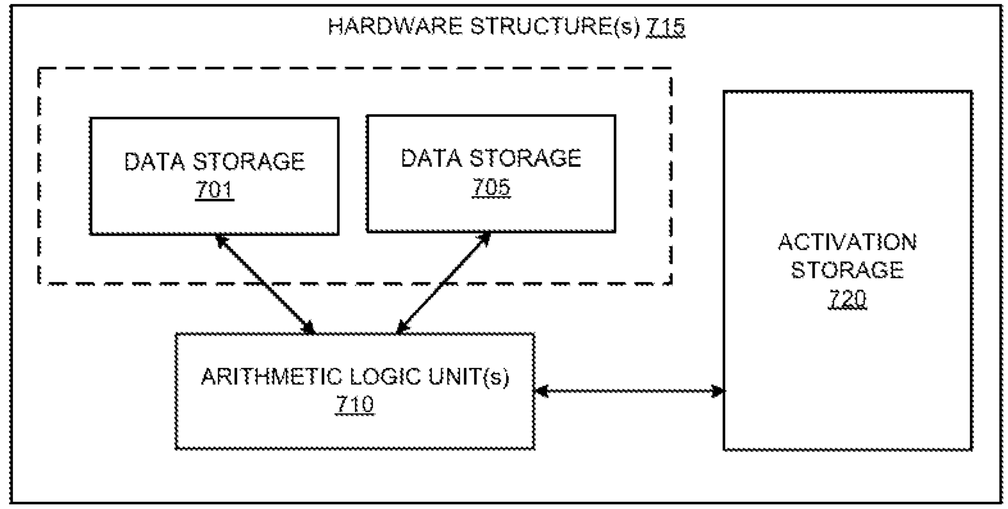
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. **7*a* may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7*a*** may be used in conjunction with central processing unit ("CPU") hardware, graphics processing unit ("GPU") hardware or other hardware, such as field programmable gate arrays ("FPGAs").

Figure 7B:
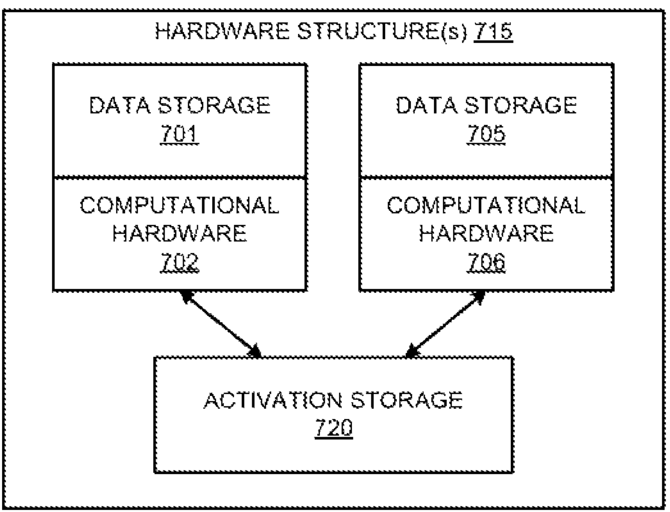
FIG. 7B illustrates inference and/or training logic, according to at least one embodiment.

FIG. **7*b* illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7*b* may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7***b* may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7*b*, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
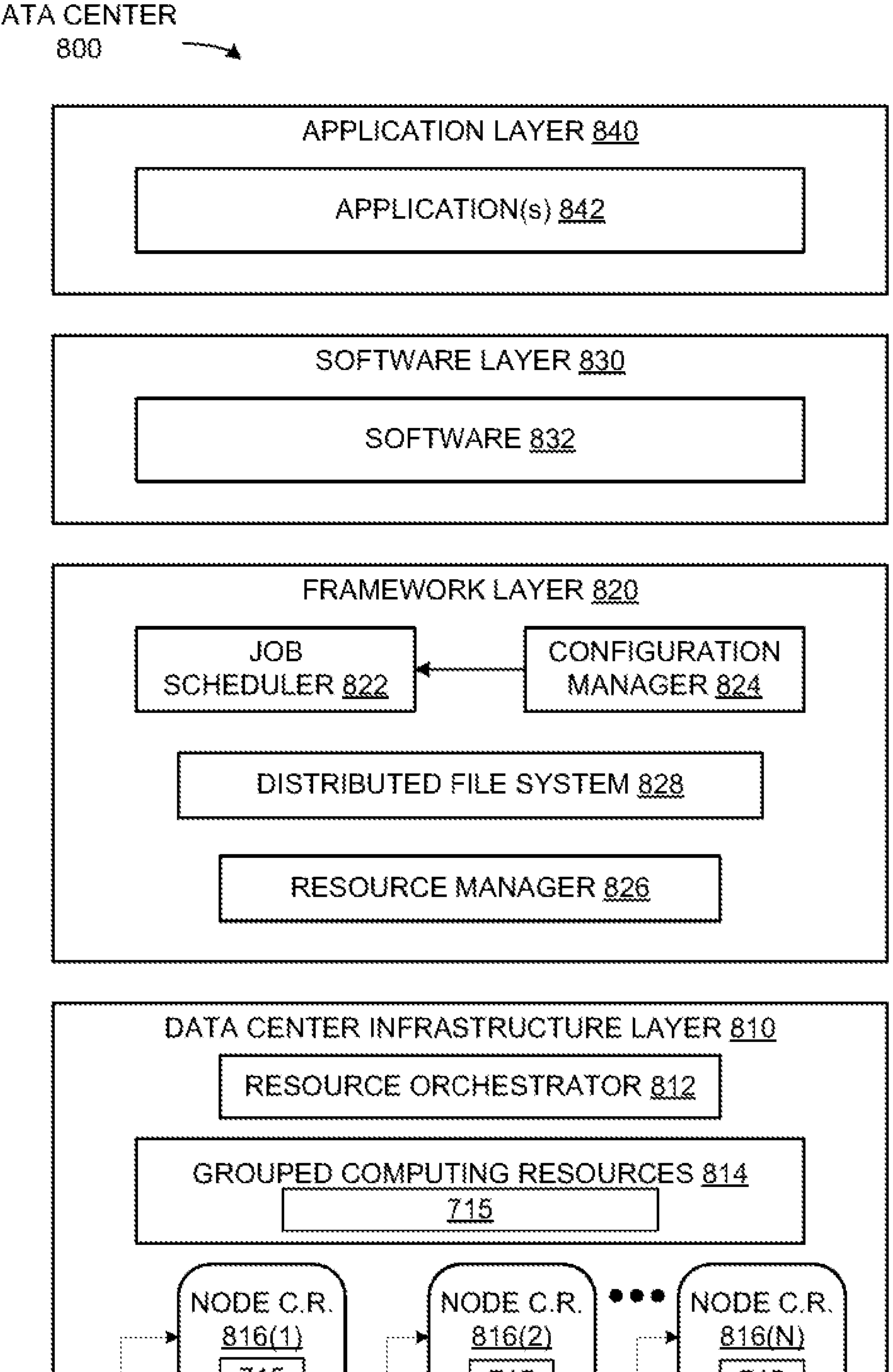
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to composite constituent images into a single representation using parameters determined from one or more quality assessment values.

Computer Systems

Figure 9:
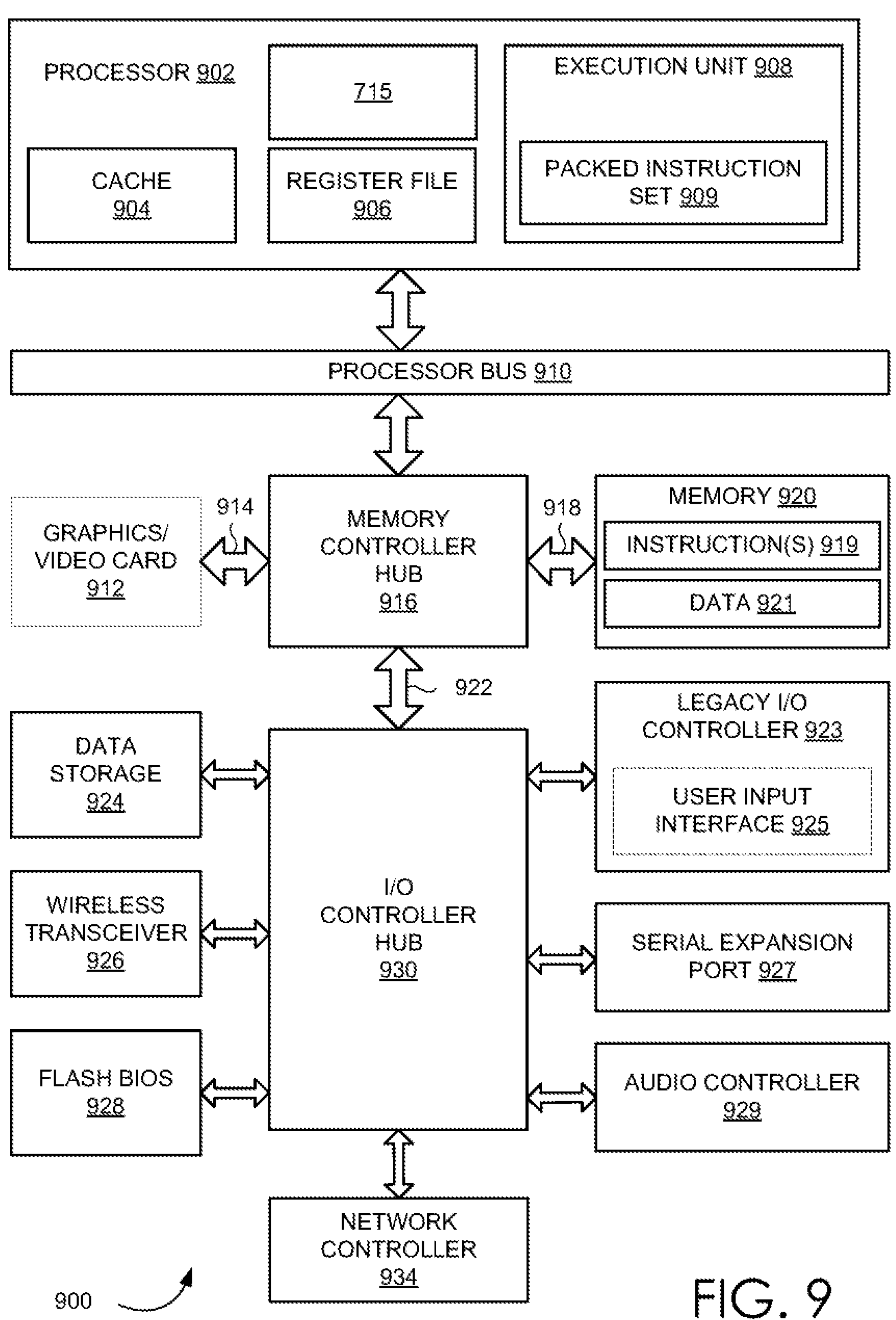
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to composite constituent images into a single representation using parameters determined from one or more quality assessment values.

Figure 10:
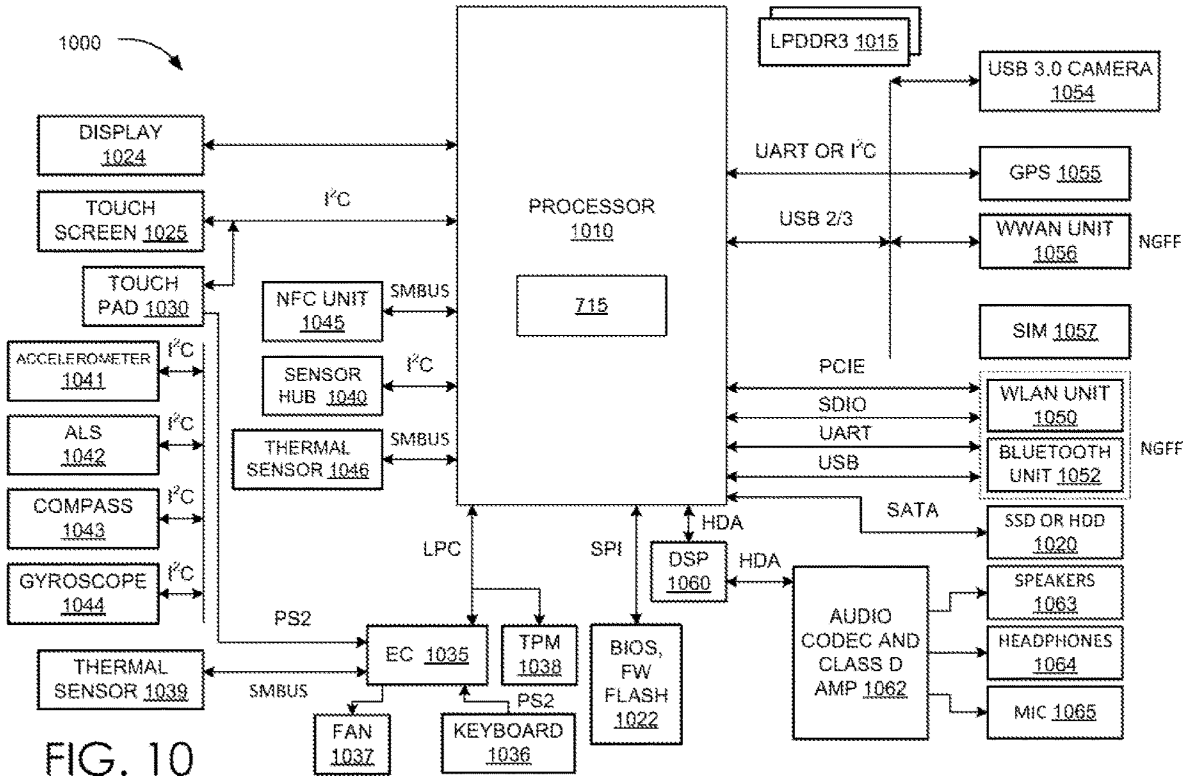
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7*a* and/or 7*b*. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to composite constituent images into a single representation using parameters determined from one or more quality assessment values.

Figure 11:
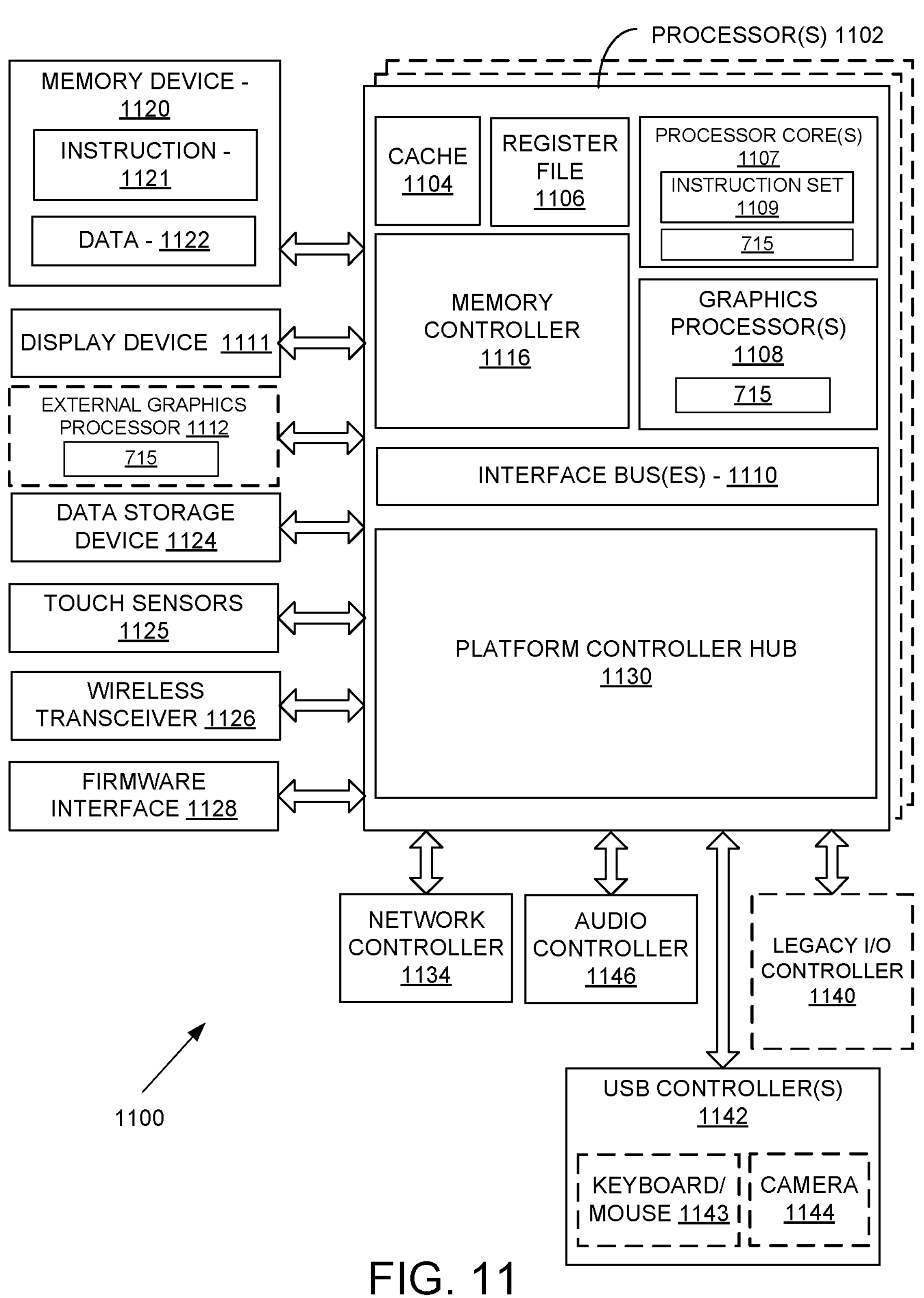
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to composite constituent images into a single representation using parameters determined from one or more quality assessment values.

Figure 12:
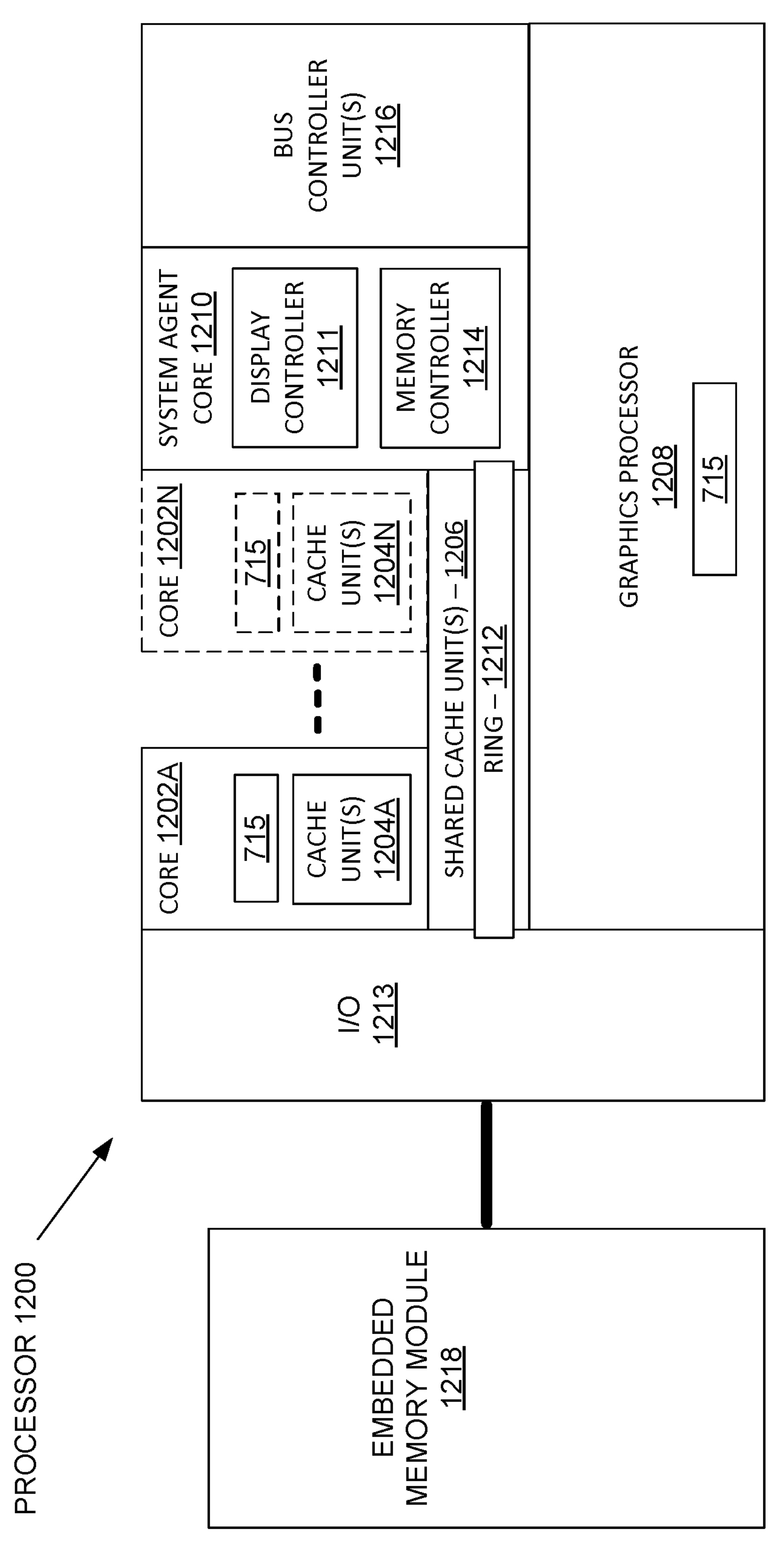
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7*a* and/or 7*b*. In at least one embodiment portions or all of inference and/or training logic 715 may be incorporated into processor 1200. For example, in at least one embodiment, training and/or inferencing techniques described herein may use one or more of ALUs embodied in graphics processor 1512, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to composite constituent images into a single representation using parameters determined from one or more quality assessment values.

Virtualized Computing Platform

Figure 13:
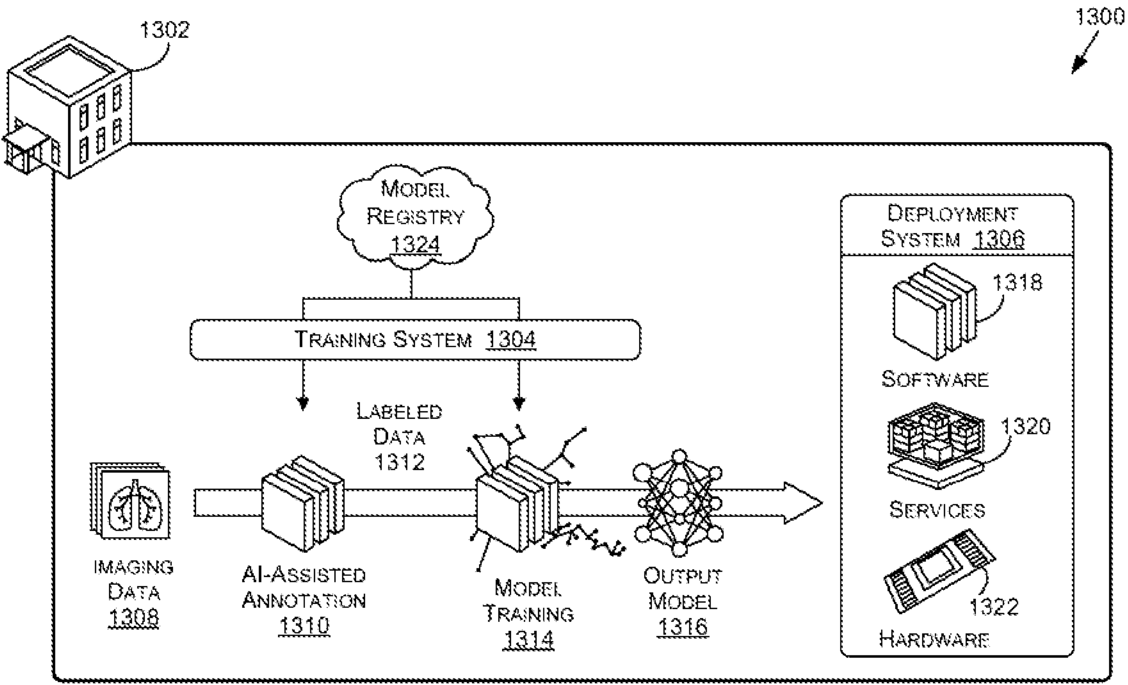
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
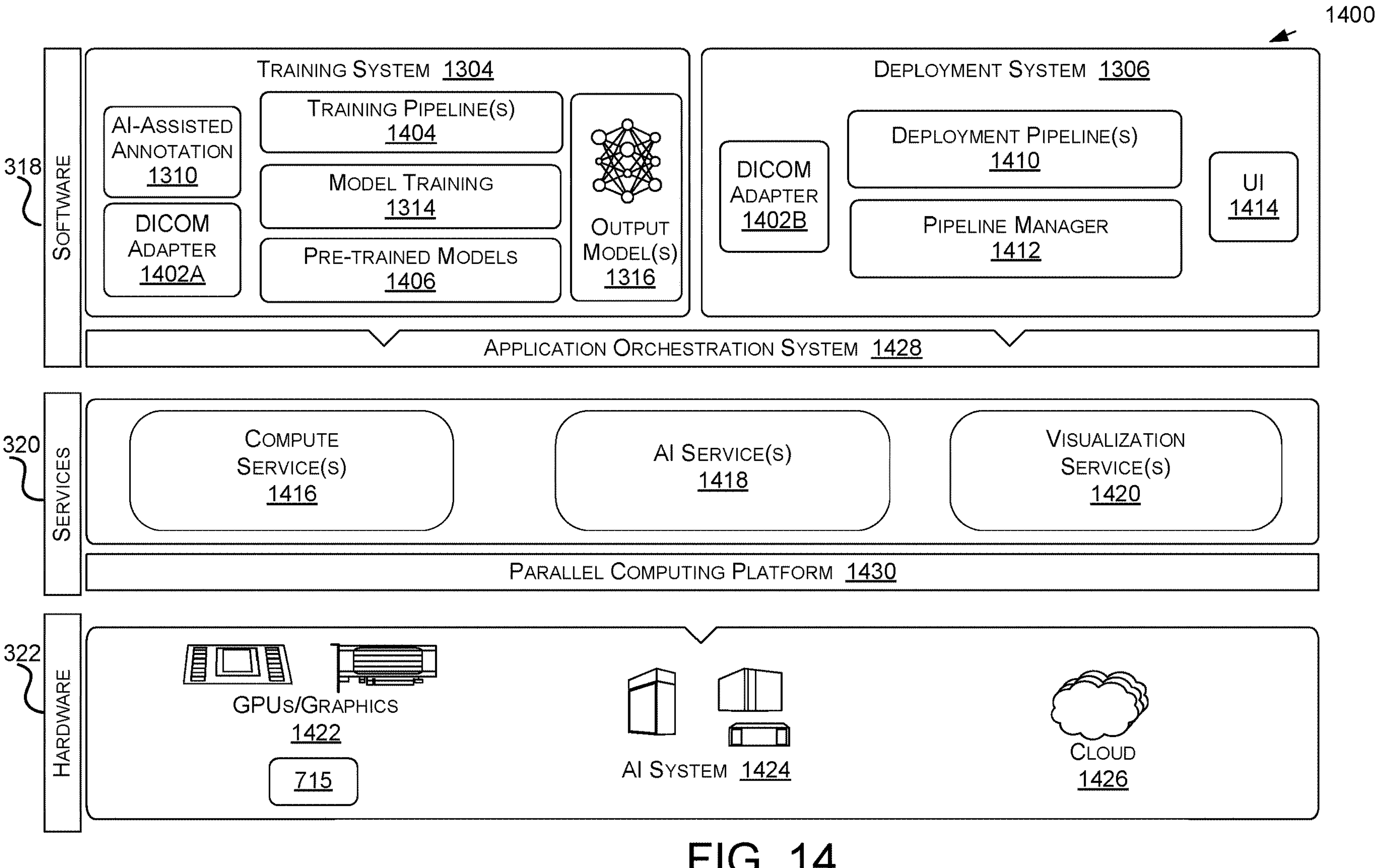
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 15A:
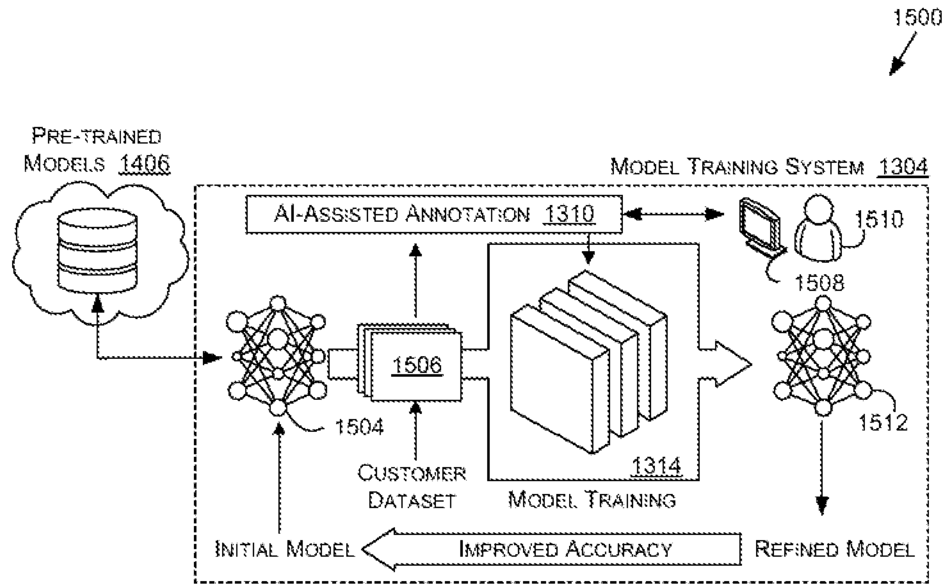
FIGS. 15A and 15B illustrate a data flow diagram for a process to train a machine learning model, as well as client-server architecture to enhance annotation tools with pre-trained annotation models, in accordance with at least one embodiment.
Figure 15B:
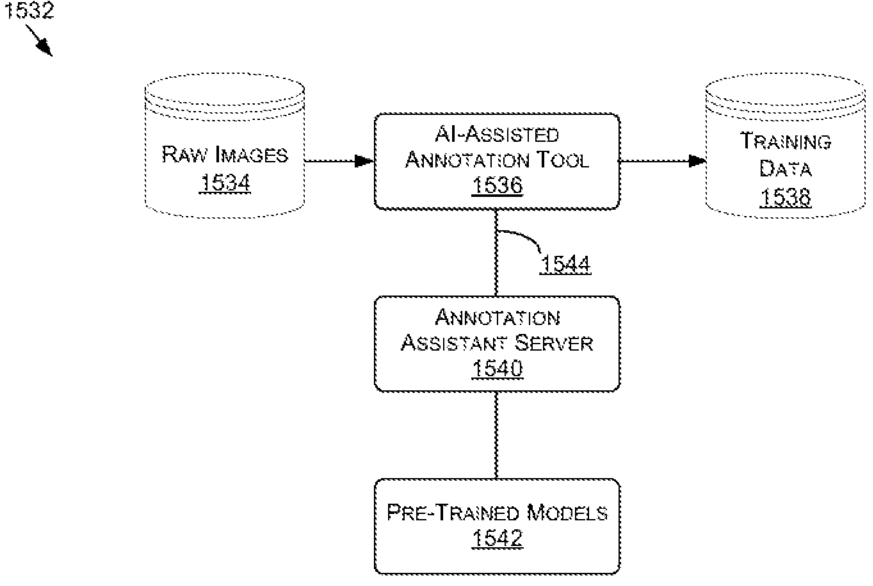

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an Mill machine, there may be a first deployment pipeline 1410, and where image enhancement is desired from output of an Mill machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12*cc*) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components can be used to composite constituent images into a single representation using parameters determined from one or more quality assessment values.

Automated Technology

Figure 16A:
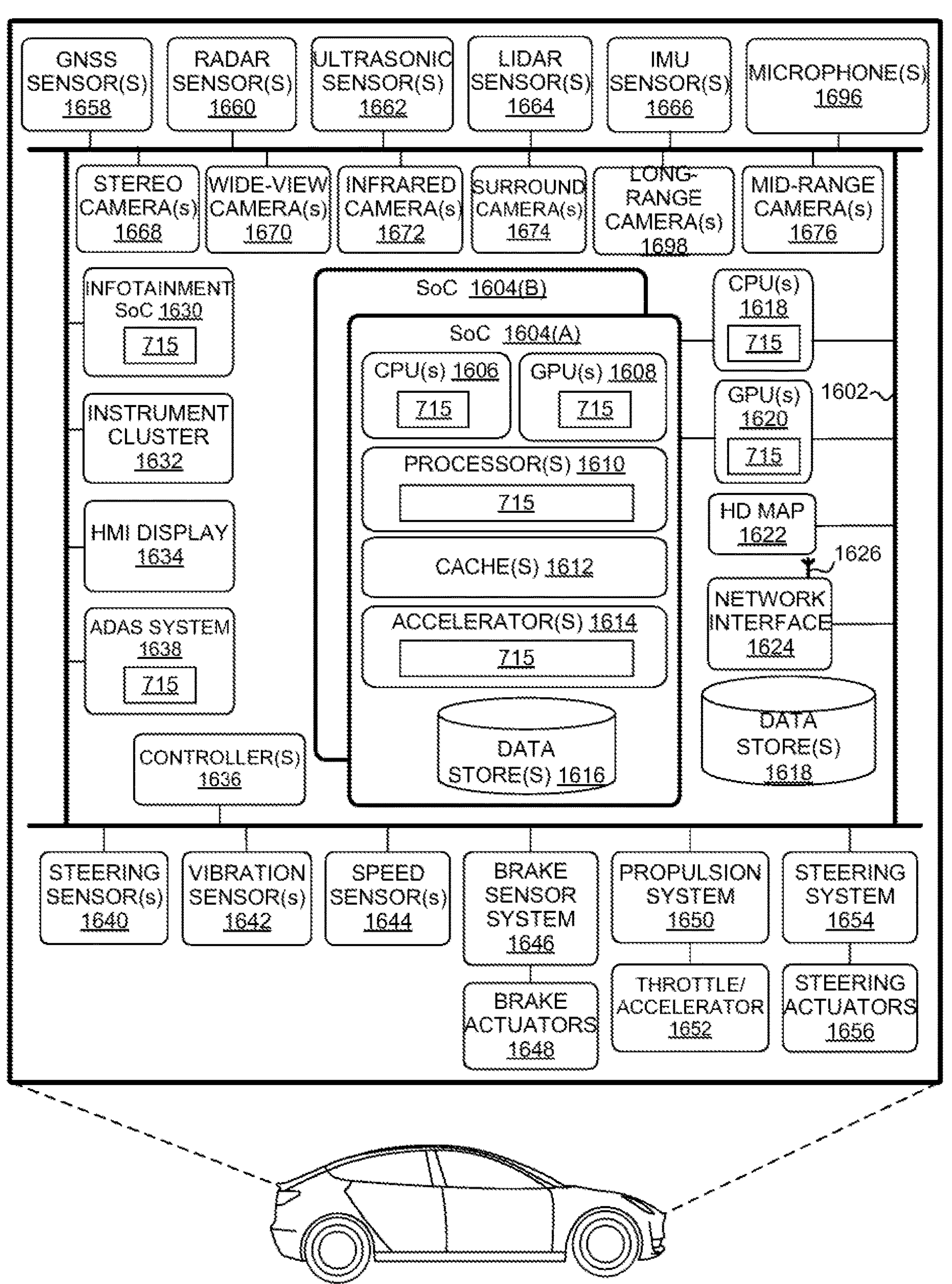
FIGS. 16A and 16B illustrate components that can be used with a vehicle system, in accordance with at least one embodiment.

FIG. 16A is a block diagram illustrating an example system architecture for autonomous vehicle 1600 of FIG. 16A, according to at least one embodiment. In at least one embodiment, each of components, features, and systems of vehicle 1600 in FIG. 16A are illustrated as being connected via a bus 1602. In at least one embodiment, bus 1602 may include, without limitation, a CAN data interface (alternatively referred to herein as a "CAN bus"). In at least one embodiment, a CAN bus may be a network inside vehicle 1600 used to aid in control of various features and functionality of vehicle 1600, such as actuation of brakes, acceleration, braking, steering, windshield wipers, etc. In at least one embodiment, bus 1602 may be configured to have dozens or even hundreds of nodes, each with its own unique identifier (e.g., a CAN ID). In at least one embodiment, bus 1602 may be read to find steering wheel angle, ground speed, engine revolutions per minute ("RPMs"), button positions, and/or other vehicle status indicators. In at least one embodiment, bus 1602 may be a CAN bus that is ASIL B compliant.

In at least one embodiment, in addition to, or alternatively from CAN, FlexRay and/or Ethernet may be used. In at least one embodiment, there may be any number of busses 1602, which may include, without limitation, zero or more CAN busses, zero or more FlexRay busses, zero or more Ethernet busses, and/or zero or more other types of busses using a different protocol. In at least one embodiment, two or more busses 1602 may be used to perform different functions, and/or may be used for redundancy. For example, a first bus 1602 may be used for collision avoidance functionality and a second bus 1602 may be used for actuation control. In at least one embodiment, each bus 1602 may communicate with any of components of vehicle 1600, and two or more busses 1602 may communicate with same components. In at least one embodiment, each of any number of system(s) on chip(s) ("SoC(s)") 1604, each of controller(s) 1636, and/or each computer within vehicle may have access to same input data (e.g., inputs from sensors of vehicle 1600), and may be connected to a common bus, such CAN bus.

In at least one embodiment, vehicle 1600 may include one or more controller(s) 1636, such as those described herein with respect to FIG. 1A. Controller(s) 1636 may be used for a variety of functions. In at least one embodiment, controller(s) 1636 may be coupled to any of various other components and systems of vehicle 1600, and may be used for control of vehicle 1600, artificial intelligence of vehicle 1600, infotainment for vehicle 1600, and/or like.

In at least one embodiment, vehicle 1600 may include any number of SoCs 1604. Each of SoCs 1604 may include, without limitation, central processing units ("CPU(s)") 1606, graphics processing units ("GPU(s)") 1608, processor(s) 1610, cache(s) 1612, accelerator(s) 1614, data store(s) 1616, and/or other components and features not illustrated. In at least one embodiment, SoC(s) 1604 may be used to control vehicle 1600 in a variety of platforms and systems. For example, in at least one embodiment, SoC(s) 1604 may be combined in a system (e.g., system of vehicle 1600) with a High Definition ("HD") map 1622 which may obtain map refreshes and/or updates via network interface 1624 from one or more servers (not shown in FIG. 16A).

In at least one embodiment, CPU(s) 1606 may include a CPU cluster or CPU complex (alternatively referred to herein as a "CCPLEX"). In at least one embodiment, CPU(s) 1606 may include multiple cores and/or level two ("L2") caches. For instance, in at least one embodiment, CPU(s) 1606 may include eight cores in a coherent multi-processor configuration. In at least one embodiment, CPU(s) 1606 may include four dual-core clusters where each cluster has a dedicated L2 cache (e.g., a 2 MB L2 cache). In at least one embodiment, CPU(s) 1606 (e.g., CCPLEX) may be configured to support simultaneous cluster operation enabling any combination of clusters of CPU(s) 1606 to be active at any given time.

In at least one embodiment, one or more of CPU(s) 1606 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1606 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1608 may include an integrated GPU (alternatively referred to herein as an "iGPU"). In at least one embodiment, GPU(s) 1608 may be programmable and may be efficient for parallel workloads. In at least one embodiment, GPU(s) 1608, in at least one embodiment, may use an enhanced tensor instruction set. In at least one embodiment, GPU(s) 1608 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1608 may include at least eight streaming microprocessors. In at least one embodiment, GPU(s) 1608 may use compute application programming interface(s) (API(s)). In at least one embodiment, GPU(s) 1608 may use one or more parallel computing platforms and/or programming models (e.g., NVIDIA's CUDA).

In at least one embodiment, one or more of GPU(s) 1608 may be power-optimized for best performance in automotive and embedded use cases. For example, in on embodiment, GPU(s) 1608 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1608 may include a high bandwidth memory ("HBM) and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1608 may include unified memory technology. In at least one embodiment, address translation services ("ATS") support may be used to allow GPU(s) 1608 to access CPU(s) 1606 page tables directly. In at least one embodiment, embodiment, when GPU(s) 1608 memory management unit ("MMU") experiences a miss, an address translation request may be transmitted to CPU(s) 1606. In response, CPU(s) 1606 may look in its page tables for virtual-to-physical mapping for address and transmits translation back to GPU(s) 1608, in at least one embodiment. In at least one embodiment, unified memory technology may allow a single unified virtual address space for memory of both CPU(s) 1606 and GPU(s) 1608, thereby simplifying GPU(s) 1608 programming and porting of applications to GPU(s) 1608.

In at least one embodiment, GPU(s) 1608 may include any number of access counters that may keep track of frequency of access of GPU(s) 1608 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1604 may include any number of cache(s) 1612, including those described herein. For example, in at least one embodiment, cache(s) 1612 could include a level three ("L3") cache that is available to both CPU(s) 1606 and GPU(s) 1608 (e.g., that is connected both CPU(s) 1606 and GPU(s) 1608). In at least one embodiment, cache(s) 1612 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1604 may include one or more accelerator(s) 1614 (e.g., hardware accelerators, software accelerators, or a combination thereof). In at least one embodiment, SoC(s) 1604 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1608 and to off-load some of tasks of GPU(s) 1608 (e.g., to free up more cycles of GPU(s) 1608 for performing other tasks). In at least one embodiment, accelerator(s) 1614 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1614 (e.g., hardware acceleration cluster) may include a deep learning accelerator(s) ("DLA(s)"). DLA(s) may include, without limitation, one or more Tensor processing units ("TPU(s)") that may be configured to provide an additional ten trillion operations per second for deep learning applications and inferencing. In at least one embodiment, TPU(s) may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1696; a CNN for facial recognition and vehicle owner identification using data from camera sensors; and/or a CNN for security and/or safety related events.

In at least one embodiment, DLA(s) may perform any function of GPU(s) 1608, and by using an inference accelerator, for example, a designer may target either DLA(s) or GPU(s) 1608 for any function. For example, in at least one embodiment, designer may focus processing of CNNs and floating point operations on DLA(s) and leave other functions to GPU(s) 1608 and/or other accelerator(s) 1614.

In at least one embodiment, accelerator(s) 1614 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1638, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1606. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1614 (e.g., hardware acceleration cluster) may include a computer vision network on-chip and static random-access memory ("SRAM"), for providing a high-bandwidth, low latency SRAM for accelerator(s) 1614. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1604 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1614 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1600, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1666 that correlates with vehicle 1600 orientation, distance, 3D location estimates of object obtained from neural network and/or other sensors (e.g., LIDAR sensor(s) 1664 or RADAR sensor(s) 1660), among others.

In at least one embodiment, one or more of SoC(s) 1604 may include data store(s) 1616 (e.g., memory). In at least one embodiment, data store(s) 1616 may be on-chip memory of SoC(s) 1604, which may store neural networks to be executed on GPU(s) 1608 and/or DLA. In at least one embodiment, data store(s) 1616 may be large enough in capacity to store multiple instances of neural networks for redundancy and safety. In at least one embodiment, data store(s) 1616 may comprise L2 or L3 cache(s).

In at least one embodiment, one or more of SoC(s) 1604 may include any number of processor(s) 1610 (e.g., embedded processors). In at least one embodiment, processor(s) 1610 may include a boot and power management processor that may be a dedicated processor and subsystem to handle boot power and management functions and related security enforcement. In at least one embodiment, boot and power management processor may be a part of SoC(s) 1604 boot sequence and may provide runtime power management services. In at least one embodiment, boot power and management processor may provide clock and voltage programming, assistance in system low power state transitions, management of SoC(s) 1604 thermals and temperature sensors, and/or management of SoC(s) 1604 power states. In at least one embodiment, each temperature sensor may be implemented as a ring-oscillator whose output frequency is proportional to temperature, and SoC(s) 1604 may use ring-oscillators to detect temperatures of CPU(s) 1606, GPU(s) 1608, and/or accelerator(s) 1614. In at least one embodiment, if temperatures are determined to exceed a threshold, then boot and power management processor may enter a temperature fault routine and put SoC(s) 1604 into a lower power state and/or put vehicle 1600 into a chauffeur to safe stop mode (e.g., bring vehicle 1600 to a safe stop).

In at least one embodiment, processor(s) 1610 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1610 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1610 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1610 may further include a real-time camera engine that may include, without limitation, a dedicated processor subsystem for handling real-time camera management. In at least one embodiment, processor (s) 1610 may further include a high-dynamic range signal processor that may include, without limitation, an image signal processor that is a hardware engine that is part of camera processing pipeline.

In at least one embodiment, processor(s) 1610 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1670, surround camera(s) 1674, and/or on in-cabin monitoring camera sensor(s). In at least one embodiment, in-cabin monitoring camera sensor(s) are preferably monitored by a neural network running on another instance of SoC(s) 1604, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1608 are not required to continuously render new surfaces. In at least one embodiment, when GPU(s) 1608 are powered on and active doing 3D rendering, video image compositor may be used to offload GPU(s) 1608 to improve performance and responsiveness.

In at least one embodiment, one or more of SoC(s) 1604 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1604 may further include an input/output controller(s) that may be controlled by software and may be used for receiving I/O signals that are uncommitted to a specific role.

In at least one embodiment, one or more of SoC(s) 1604 may further include a broad range of peripheral interfaces to enable communication with peripherals, audio encoders/decoders ("codecs"), power management, and/or other devices. SoC(s) 1604 may be used to process data from cameras (e.g., connected over Gigabit Multimedia Serial Link and Ethernet), sensors (e.g., LIDAR sensor(s) 1664, RADAR sensor(s) 1660, etc. that may be connected over Ethernet), data from bus 1602 (e.g., speed of vehicle 1600, steering wheel position, etc.), data from GNSS sensor(s) 1658 (e.g., connected over Ethernet or CAN bus), etc. In at least one embodiment, one or more of SoC(s) 1604 may further include dedicated high-performance mass storage controllers that may include their own DMA engines, and that may be used to free CPU(s) 1606 from routine data management tasks.

In at least one embodiment, SoC(s) 1604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1604 may be faster, more reliable, and even more energy-efficient and space-efficient than conventional systems. For example, in at least one embodiment, accelerator(s) 1614, when combined with CPU(s) 1606, GPU(s) 1608, and data store(s) 1616, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1620) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, a sign itself may be identified as a traffic sign by a first deployed neural network (e.g., a neural network that has been trained) and a text "flashing lights indicate icy conditions" may be interpreted by a second deployed neural network, which informs vehicle's path planning software (preferably executing on CPU Complex) that when flashing lights are detected, icy conditions exist. In at least one embodiment, a flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1608.

In at least one embodiment, a CNN for facial recognition and vehicle owner identification may use data from camera sensors to identify presence of an authorized driver and/or owner of vehicle 1600. In at least one embodiment, an always on sensor processing engine may be used to unlock vehicle when owner approaches driver door and turn on lights, and, in security mode, to disable vehicle when owner leaves vehicle. In this way, SoC(s) 1604 provide for security against theft and/or carjacking.

In at least one embodiment, a CNN for emergency vehicle detection and identification may use data from microphones 1696 to detect and identify emergency vehicle sirens. In at least one embodiment, SoC(s) 1604 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1658. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1662, until emergency vehicle(s) passes.

In at least one embodiment, vehicle 1600 may include CPU(s) 1618 (e.g., discrete CPU(s), or dCPU(s)), that may be coupled to SoC(s) 1604 via a high-speed interconnect (e.g., PCIe). In at least one embodiment, CPU(s) 1618 may include an X86 processor, for example. CPU(s) 1618 may be used to perform any of a variety of functions, including arbitrating potentially inconsistent results between ADAS sensors and SoC(s) 1604, and/or monitoring status and health of controller(s) 1636 and/or an infotainment system on a chip ("infotainment SoC") 1630, for example.

In at least one embodiment, vehicle 1600 may include GPU(s) 1620 (e.g., discrete GPU(s), or dGPU(s)), that may be coupled to SoC(s) 1604 via a high-speed interconnect (e.g., NVIDIA's NVLINK). In at least one embodiment, GPU(s) 1620 may provide additional artificial intelligence functionality, such as by executing redundant and/or different neural networks, and may be used to train and/or update neural networks based at least in part on input (e.g., sensor data) from sensors of vehicle 1600.

In at least one embodiment, vehicle 1600 may further include network interface 1624 which may include, without limitation, wireless antenna(s) 1626 (e.g., one or more wireless antennas 1626 for different communication protocols, such as a cellular antenna, a Bluetooth antenna, etc.). In at least one embodiment, network interface 1624 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 160 and other vehicle and/or an indirect link may be established (e.g., across networks and over Internet). In at least one embodiment, direct links may be provided using a vehicle-to-vehicle communication link. A vehicle-to-vehicle communication link may provide vehicle 1600 information about vehicles in proximity to vehicle 1600 (e.g., vehicles in front of, on side of, and/or behind vehicle 1600). In at least one embodiment, aforementioned functionality may be part of a cooperative adaptive cruise control functionality of vehicle 1600.

In at least one embodiment, network interface 1624 may include an SoC that provides modulation and demodulation functionality and enables controller(s) 1636 to communicate over wireless networks. In at least one embodiment, network interface 1624 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1600 may further include data store(s) 1628 which may include, without limitation, off-chip (e.g., off SoC(s) 1604) storage. In at least one embodiment, data store(s) 1628 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1600 may further include GNSS sensor(s) 1658 (e.g., GPS and/or assisted GPS sensors), to assist in mapping, perception, occupancy grid generation, and/or path planning functions. In at least one embodiment, any number of GNSS sensor(s) 1658 may be used, including, for example and without limitation, a GPS using a USB connector with an Ethernet to Serial (e.g., RS-232) bridge.

In at least one embodiment, vehicle 1600 may further include RADAR sensor(s) 1660. RADAR sensor(s) 1660 may be used by vehicle 1600 for long-range vehicle detection, even in darkness and/or severe weather conditions. In at least one embodiment, RADAR functional safety levels may be ASIL B. RADAR sensor(s) 1660 may use CAN and/or bus 1602 (e.g., to transmit data generated by RADAR sensor(s) 1660) for control and to access object tracking data, with access to Ethernet to access raw data in some examples. In at least one embodiment, wide variety of RADAR sensor types may be used. For example, and without limitation, RADAR sensor(s) 1660 may be suitable for front, rear, and side RADAR use. In at least one embodiment, one or more of RADAR sensors(s) 1660 are Pulse Doppler RADAR sensor(s).

In at least one embodiment, RADAR sensor(s) 1660 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1660 may help in distinguishing between static and moving objects, and may be used by ADAS system 1638 for emergency brake assist and forward collision warning. Sensors 1660(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle 1600's surroundings at higher speeds with minimal interference from traffic in adjacent lanes. In at least one embodiment, other two antennae may expand field of view, making it possible to quickly detect vehicles entering or leaving vehicle 1600's lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1660 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1638 for blind spot detection and/or lane change assist.

In at least one embodiment, vehicle 1600 may further include ultrasonic sensor(s) 1662. Ultrasonic sensor(s) 1662, which may be positioned at front, back, and/or sides of vehicle 1600, may be used for park assist and/or to create and update an occupancy grid. In at least one embodiment, a wide variety of ultrasonic sensor(s) 1662 may be used, and different ultrasonic sensor(s) 1662 may be used for different ranges of detection (e.g., 2.5 m, 4 m). In at least one embodiment, ultrasonic sensor(s) 1662 may operate at functional safety levels of ASIL B.

In at least one embodiment, vehicle 1600 may include LIDAR sensor(s) 1664. LIDAR sensor(s) 1664 may be used for object and pedestrian detection, emergency braking, collision avoidance, and/or other functions. In at least one embodiment, LIDAR sensor(s) 1664 may be functional safety level ASIL B. In at least one embodiment, vehicle 1600 may include multiple LIDAR sensors 1664 (e.g., two, four, six, etc.) that may use Ethernet (e.g., to provide data to a Gigabit Ethernet switch).

In at least one embodiment, LIDAR sensor(s) 1664 may be capable of providing a list of objects and their distances for a 360-degree field of view. In at least one embodiment, commercially available LIDAR sensor(s) 1664 may have an advertised range of approximately 100 m, with an accuracy of 2 cm-3 cm, and with support for a 100 Mbps Ethernet connection, for example. In at least one embodiment, one or more non-protruding LIDAR sensors 1664 may be used. In such an embodiment, LIDAR sensor(s) 1664 may be implemented as a small device that may be embedded into front, rear, sides, and/or corners of vehicle 1600. In at least one embodiment, LIDAR sensor(s) 1664, in such an embodiment, may provide up to a 120-degree horizontal and 35-degree vertical field-of-view, with a 200 m range even for low-reflectivity objects. In at least one embodiment, front-mounted LIDAR sensor(s) 1664 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1600 up to approximately 200 m. In at least one embodiment, a flash LIDAR unit includes, without limitation, a receptor, which records laser pulse transit time and reflected light on each pixel, which in turn corresponds to range from vehicle 1600 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1600. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device(s) may use a 5 nanosecond class I (eye-safe) laser pulse per frame and may capture reflected laser light in form of 3D range point clouds and co-registered intensity data.

In at least one embodiment, vehicle may further include IMU sensor(s) 1666. In at least one embodiment, IMU sensor(s) 1666 may be located at a center of rear axle of vehicle 1600, in at least one embodiment. In at least one embodiment, IMU sensor(s) 1666 may include, for example and without limitation, accelerometer(s), magnetometer(s), gyroscope(s), magnetic compass(es), and/or other sensor types. In at least one embodiment, such as in six-axis applications, IMU sensor(s) 1666 may include, without limitation, accelerometers and gyroscopes. In at least one embodiment, such as in nine-axis applications, IMU sensor(s) 1666 may include, without limitation, accelerometers, gyroscopes, and magnetometers.

In at least one embodiment, IMU sensor(s) 1666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1666 may enable vehicle 1600 to estimate heading without requiring input from a magnetic sensor by directly observing and correlating changes in velocity from GPS to IMU sensor(s) 1666. In at least one embodiment, IMU sensor(s) 1666 and GNSS sensor(s) 1658 may be combined in a single integrated unit.

In at least one embodiment, vehicle 1600 may include microphone(s) 1696 placed in and/or around vehicle 1600. In at least one embodiment, microphone(s) 1696 may be used for emergency vehicle detection and identification, among other things.

In at least one embodiment, vehicle 1600 may further include any number of camera types, including stereo camera(s) 1668, wide-view camera(s) 1670, infrared camera(s) 1672, surround camera(s) 1674, long-range camera(s) 1698, mid-range camera(s) 1676, and/or other camera types. In at least one embodiment, cameras may be used to capture image data around an entire periphery of vehicle 1600. In at least one embodiment, types of cameras used depends on vehicle 1600. In at least one embodiment, any combination of camera types may be used to provide necessary coverage around vehicle 1600. In at least one embodiment, number of cameras may differ depending on embodiment. For example, in at least one embodiment, vehicle 1600 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 16A and FIG. 16B.

In at least one embodiment, vehicle 1600 may further include vibration sensor(s) 1642. In at least one embodiment, vibration sensor(s) 1642 may measure vibrations of components of vehicle 1600, such as axle(s). For example, in at least one embodiment, changes in vibrations may indicate a change in road surfaces. In at least one embodiment, when two or more vibration sensors 1642 are used, differences between vibrations may be used to determine friction or slippage of road surface (e.g., when difference in vibration is between a power-driven axle and a freely rotating axle).

In at least one embodiment, vehicle 1600 may include ADAS system 1638. ADAS system 1638 may include, without limitation, an SoC, in some examples. In at least one embodiment, ADAS system 1638 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1660, LIDAR sensor(s) 1664, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1600 and automatically adjust speed of vehicle 1600 to maintain a safe distance from vehicles ahead. In at least one embodiment, lateral ACC system performs distance keeping, and advises vehicle 1600 to change lanes when necessary. In at least one embodiment, lateral ACC is related to other ADAS applications such as LC and CW.

In at least one embodiment, CACC system uses information from other vehicles that may be received via network interface 1624 and/or wireless antenna(s) 1626 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1600), while I2V communication concept provides information about traffic further ahead. In at least one embodiment, CACC system may include either or both I2V and V2V information sources. In at least one embodiment, given information of vehicles ahead of vehicle 1600, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1660, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1660, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1600 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1600 if vehicle 1600 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1660, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1600 is backing up. In at least one embodiment, RCTW system includes AEB system to ensure that vehicle brakes are applied to avoid a crash. In at least one embodiment, RCTW system may use one or more rear-facing RADAR sensor(s) 1660, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1600 itself decides, in case of conflicting results, whether to heed result from a primary computer or a secondary computer (e.g., first controller 1636 or second controller 1636). For example, in at least one embodiment, ADAS system 1638 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1638 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1604.

In at least one embodiment, ADAS system 1638 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1638 may be fed into primary computer's perception block and/or primary computer's dynamic driving task block. For example, in at least one embodiment, if ADAS system 1638 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1600 may further include infotainment SoC 1630 (e.g., an in-vehicle infotainment system (IVI)). Although illustrated and described as an SoC, infotainment system 1630, in at least one embodiment, may not be an SoC, and may include, without limitation, two or more discrete components. In at least one embodiment, infotainment SoC 1630 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1600. For example, infotainment SoC 1630 could include radios, disk players, navigation systems, video players, USB and Bluetooth connectivity, carputers, in-car entertainment, WiFi, steering wheel audio controls, hands free voice control, a heads-up display ("HUD"), HMI display 1634, a telematics device, a control panel (e.g., for controlling and/or interacting with various components, features, and/or systems), and/or other components. In at least one embodiment, infotainment SoC 1630 may further be used to provide information (e.g., visual and/or audible) to user(s) of vehicle, such as information from ADAS system 1638, autonomous driving information such as planned vehicle maneuvers, trajectories, surrounding environment information (e.g., intersection information, vehicle information, road information, etc.), and/or other information.

In at least one embodiment, infotainment SoC 1630 may include any amount and type of GPU functionality. In at least one embodiment, infotainment SoC 1630 may communicate over bus 1602 (e.g., CAN bus, Ethernet, etc.) with other devices, systems, and/or components of vehicle 1600. In at least one embodiment, infotainment SoC 1630 may be coupled to a supervisory MCU such that GPU of infotainment system may perform some self-driving functions in event that primary controller(s) 1636 (e.g., primary and/or backup computers of vehicle 1600) fail. In at least one embodiment, infotainment SoC 1630 may put vehicle 1600 into a chauffeur to safe stop mode, as described herein.

In at least one embodiment, vehicle 1600 may further include instrument cluster 1632 (e.g., a digital dash, an electronic instrument cluster, a digital instrument panel, etc.). In at least one embodiment, instrument cluster 1632 may include, without limitation, a controller and/or supercomputer (e.g., a discrete controller or supercomputer). In at least one embodiment, instrument cluster 1632 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1630 and instrument cluster 1632. In at least one embodiment, instrument cluster 1632 may be included as part of infotainment SoC 1630, or vice versa.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 16A for inferencing or predicting operations based, at least in part, on weight parameters calculated using neural network training operations, neural network functions and/or architectures, or neural network use cases described herein.

Figure 16B:
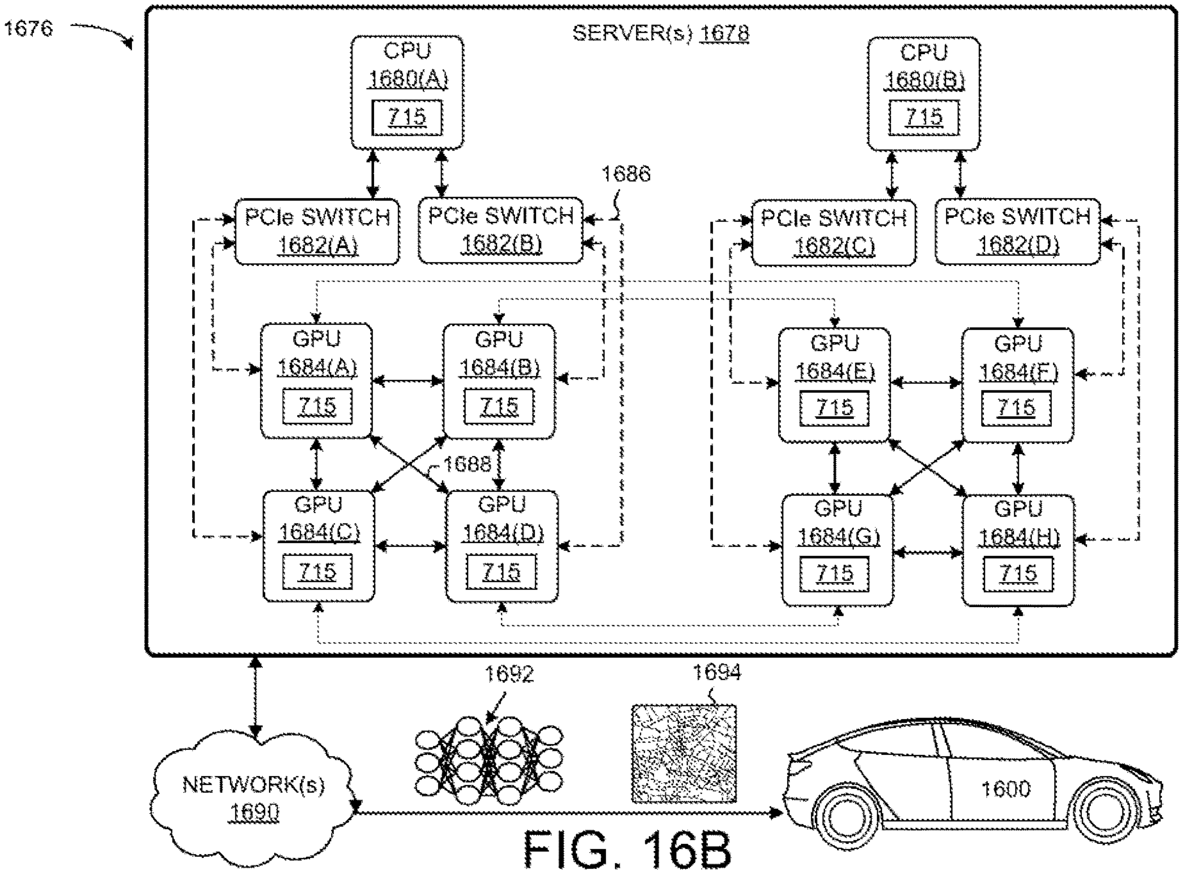

FIG. 16B is a diagram of a system 1676 for communication between cloud-based server(s) and autonomous vehicle 1600 of FIG. 16A, according to at least one embodiment. In at least one embodiment, system 1676 may include, without limitation, server(s) 1678, network(s) 1690, and any number and type of vehicles, including vehicle 1600. In at least one embodiment, server(s) 1678 may include, without limitation, a plurality of GPUs 1684(A)-1684(H) (collectively referred to herein as GPUs 1684), PCIe switches 1682(A)-1682(D) (collectively referred to herein as PCIe switches 1682), and/or CPUs 1680(A)-1680(B) (collectively referred to herein as CPUs 1680). GPUs 1684, CPUs 1680, and PCIe switches 1682 may be interconnected with high-speed interconnects such as, for example and without limitation, NVLink interfaces 1688 developed by NVIDIA and/or PCIe connections 1686. In at least one embodiment, GPUs 1684 are connected via an NVLink and/or NVSwitch SoC and GPUs 1684 and PCIe switches 1682 are connected via PCIe interconnects. In at least one embodiment, although eight GPUs 1684, two CPUs 1680, and four PCIe switches 1682 are illustrated, this is not intended to be limiting. In at least one embodiment, each of server(s) 1678 may include, without limitation, any number of GPUs 1684, CPUs 1680, and/or PCIe switches 1682, in any combination. For example, in at least one embodiment, server(s) 1678 could each include eight, sixteen, thirty-two, and/or more GPUs 1684.

In at least one embodiment, server(s) 1678 may receive, over network(s) 1690 and from vehicles, image data representative of images showing unexpected or changed road conditions, such as recently commenced road-work. In at least one embodiment, server(s) 1678 may transmit, over network(s) 1690 and to vehicles, neural networks 1692, updated neural networks 1692, and/or map information 1694, including, without limitation, information regarding traffic and road conditions. In at least one embodiment, updates to map information 1694 may include, without limitation, updates for HD map 1622, such as information regarding construction sites, potholes, detours, flooding, and/or other obstructions. In at least one embodiment, neural networks 1692, updated neural networks 1692, and/or map information 1694 may have resulted from new training and/or experiences represented in data received from any number of vehicles in environment, and/or based at least in part on training performed at a data center (e.g., using server(s) 1678 and/or other servers).

In at least one embodiment, server(s) 1678 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1690, and/or machine learning models may be used by server(s) 1678 to remotely monitor vehicles.

In at least one embodiment, server(s) 1678 may receive data from vehicles and apply data to up-to-date real-time neural networks for real-time intelligent inferencing. In at least one embodiment, server(s) 1678 may include deep-learning supercomputers and/or dedicated AI computers powered by GPU(s) 1684, such as a DGX and DGX Station machines developed by NVIDIA. However, in at least one embodiment, server(s) 1678 may include deep learning infrastructure that use CPU-powered data centers.

In at least one embodiment, deep-learning infrastructure of server(s) 1678 may be capable of fast, real-time inferencing, and may use that capability to evaluate and verify health of processors, software, and/or associated hardware in vehicle 1600. For example, in at least one embodiment, deep-learning infrastructure may receive periodic updates from vehicle 1600, such as a sequence of images and/or objects that vehicle 1600 has located in that sequence of images (e.g., via computer vision and/or other machine learning object classification techniques). In at least one embodiment, deep-learning infrastructure may run its own neural network to identify objects and compare them with objects identified by vehicle 1600 and, if results do not match and deep-learning infrastructure concludes that AI in vehicle 1600 is malfunctioning, then server(s) 1678 may transmit a signal to vehicle 1600 instructing a fail-safe computer of vehicle 1600 to assume control, notify passengers, and complete a safe parking maneuver.

In at least one embodiment, server(s) 1678 may include GPU(s) 1684 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, inference and/or training logic 715 are used to perform one or more embodiments. Details regarding inference and/or training logic 715 are provided below in conjunction with FIGS. 7A and/or 7B.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising generating, using at least two sources of localization data, a fused localization determination, the at least two sources of localization data fused based in part on weightings determined using relative confidence values associated with respective sources;

comparing the fused localization determination against at least two trusted and independent sources of localization determinations to verify the fused localization determination;

generating a navigation path, based at least on verification of the fused localization determination and using at least two sources of environment perception; comparing the navigation path against at least two trusted and independent sources of navigation path data and the fused localization determination to verify the navigation path;

determining that the navigation path is verified upon receiving two or more votes from at least two comparators, each comparator evaluating the navigation path against data from the at least two trusted and independent sources of navigation path data respectively; and providing, based at least on the navigation path being verified, the navigation path to a control system to navigate an object within the environment.

2. The method of claim 1, wherein the object is a vehicle, and wherein the navigation path comprises a lane graph generated using at least one source of map data and at least one source of environmental perception corresponding to the vehicle.

3. The method of claim 1, wherein the sources of localization data include at least one of: a camera, global positioning system (GPS), or radar system.

4. The method of claim 1, wherein the sources of environment perception include at least one of: a camera, a radar system, or a LIDAR system, an ultrasonic system, or high definition (HD) map data.

5. The method of claim 1, further comprising:

determining a confidence of the fused localization determination before performing the comparing against the at least two trusted and independent localization determinations; and replacing the fused localization determination with a most confident localization value from the at least two sources of localization determinations if the confidence falls below a confidence threshold.

6. The method of claim 1, further comprising:

determining a confidence of the navigation path before performing the comparing against the at least two trusted and independent sources of navigation path data; and replacing the navigation path with navigation data from the at least two trusted and independent sources of navigation path data corresponding to a highest confidence level if the confidence falls below a confidence threshold.

7. The method of claim 1, further comprising:

determining that at least one source of localization determination is temporarily unavailable or unreliable; and utilizing historical localization data in place of the at least one source of localization determination.

8. The method of claim 1, further comprising:

dynamically adjusting a selection of the at least two sources of localization determinations or the at least two sources of environment perception based upon an availability or confidence determination.

9. The method of claim 1, further comprising:

generating a second navigation path using a parallel path generator; and determining, dynamically, whether to provide the navigation path or the second navigation path for navigation of the object.

10. A system, comprising:

one or more processing units to:

generate, using at least two sources of localization data, a fused localization determination, the at least two sources of localization data fused based in part on weightings determined using relative confidence values associated with respective sources;

compare the fused localization determination against at least two trusted and independent localization values to verify the fused localization determination;

generate a fused navigation path, based at least on verification of the fused localization determination and using at least two sources of environment perception;

compare the fused navigation path against at least two trusted and independent sources of navigation path data and the fused localization determination to verify the fused navigation path;

determine that the fused navigation path is verified upon receiving two or more votes from at least two comparators, each comparator evaluating the fused navigation path against data from the at least two trusted and independent sources of navigation path data respectively; and provide, based at least on the trust in the fused navigation path being verified, the fused navigation path to a control system to navigate an object within the environment.

11. The system of claim 10, wherein the one or more processing units are further to:

determine a confidence of the fused localization determination before performing the comparing against the at least two trusted and independent localization values;

replace the fused localization determination with a most confident localization value from the at least two sources of localization data if the confidence falls below a confidence threshold;

determine a confidence of the fused navigation path before performing the comparing against the at least two trusted and independent sources of navigation path data; and replace the fused navigation path with most confident navigation data from the at least two trusted and independent sources of navigation data if the confidence falls below a confidence threshold.

12. The system of claim 10, wherein one or more processing units are further to:

determine that at least one source of localization data is temporarily unavailable or unreliable; and utilize historical localization data in place of the at least one source of localization data.

13. The system of claim 10, wherein one or more processing units are further to:

generate a second navigation path using a parallel path generator; and determine, dynamically, whether to provide the fused navigation path or the second navigation path for navigation of the object.

14. The system of claim 10, wherein the system comprises at least one of:

a system for performing simulation operations;

a system for performing simulation operations to test or validate autonomous machine applications;

a system for rendering graphical output;

a system for performing deep learning operations;

a system implemented using an edge device;

a system incorporating one or more Virtual Machines (VMs);

a system implemented at least partially in a data center; or a system implemented at least partially using cloud computing resources.

15. A processor, comprising:

one or more processing units to:

generate a verified localization determination that is fused using at least two sources of localization data and compared against at least two trusted and independent localization values;

generate a verified navigation path for an environment using at least the verified localization determination, wherein the navigation path is verified upon receiving two or more votes from at least two comparators, each comparator evaluating the navigation path against data from at least two trusted and independent sources of navigation path data respectively and the verified localization determination; and provide the verified navigation path to a control system to navigate an object within the environment.

16. The processor of claim 15, wherein at least one processing unit of the one or more processing units is further configured to:

verify the verified localization determination by comparing an unverified localization determination against the at least two trusted and independent localization values;

generate an unverified navigation path using at least two sources of environment perception and the verified localization determination; and verify the verified navigation path by comparing the unverified navigation path against the at least two trusted and independent sources of navigation path data.

17. The processor of claim 16, wherein at least one processing unit of the one or more processing units is further configured to:

determine a confidence of the unverified localization determination before performing the comparing against the at least two trusted and independent localization values; and replacing the unverified localization determination with a most confident localization value from the at least two sources of localization data if the confidence falls below a confidence threshold.

18. The processor of claim 16, wherein at least one processing unit of the one or more processing units is further configured to:

determine a confidence of the unverified navigation path before performing the comparing against the at least two trusted and independent sources of navigation path data; and replacing the unverified navigation path with navigation data from the at least two trusted and independent sources of navigation path data corresponding to a highest confidence level if the confidence falls below a confidence threshold.

19. The processor of claim 15, wherein the object is a vehicle, and wherein the verified navigation path comprises a lane graph generated using at least one source of map data and at least one source of environmental perception corresponding to the vehicle.

20. The processor of claim 16, wherein the sources of localization data include at least one of: a camera, global positioning system (GPS), or radar system; and wherein the sources of environment perception include at least one of: a camera, a radar system, or a LIDAR system, an ultrasonic system, or high definition (HD) map data.

* * * * *